US011681424B2

(12) United States Patent
Douglas et al.

(10) Patent No.: US 11,681,424 B2
(45) Date of Patent: Jun. 20, 2023

(54) MAP CALENDAR GRAPHICAL USER INTERFACE WITH CONTENT-VARIABLE VIEW LEVELS

(71) Applicant: Microsoft Technology Licensing, LLC, Redmond, WA (US)

(72) Inventors: Malia Douglas, Seattle, WA (US); Rachel Sirkin, Seattle, WA (US); Aaron E. Erlandson, Kirkland, WA (US); Yoon Jin Lee, Woodinville, WA (US); Stephen White, Grand Rapids, MI (US); Erin Greenly, Seattle, WA (US); Evan W. Lavender, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/321,050

(22) Filed: May 14, 2021

(65) Prior Publication Data

US 2022/0365665 A1 Nov. 17, 2022

(51) Int. Cl.
*G06F 3/04847* (2022.01)
*G06F 3/04842* (2022.01)
(Continued)

(52) U.S. Cl.
CPC ........ *G06F 3/04847* (2013.01); *G06F 3/0485* (2013.01); *G06F 3/04842* (2013.01); *G06Q 10/109* (2013.01)

(58) Field of Classification Search
CPC ............. G06F 3/04847; G06F 3/04842; G06F 3/0485; G06Q 10/109
See application file for complete search history.

(56) References Cited

U.S. PATENT DOCUMENTS 5,845,257 A  12/1998  Fu et al.
5,874,965 A *  2/1999  Takai ............... G06F 3/0481
                                                        715/963
(Continued)

FOREIGN PATENT DOCUMENTS

CN   101145223 A   3/2008
CN   101520862 A   9/2009
(Continued)

OTHER PUBLICATIONS

"Behavior and Format of the Date and Time Field", Retrieved From: https://docs.microsoft.com/en-us/previous-versions/dynamicscrm-2016/administering-dynamics-365/dn946904(v=crm.8)?redirectedfrom= MSDN, Nov. 28, 2016, 10 Pages.

(Continued)

*Primary Examiner* — John T Repsher, III
(74) *Attorney, Agent, or Firm* — Ray Quinney & Nebeker P.C.; Paul N. Taylor

(57) ABSTRACT

A computer-implemented method for implementing a map calendar graphical user interface (GUI) including content-variable view levels is described herein. The method includes executing a map calendar application to provide a map calendar GUI surfaced on a display. The map calendar GUI includes interactive visualizations of a map calendar that are organized into content-variable view levels that relate to specific units of time. The method also includes displaying, via the surfaced map calendar GUI, interactive visualizations of different content-variable view levels such that non-level-specific calendar content items are displayed with respect to all content-variable view levels that encompass the time fragments corresponding to the non-level-specific calendar content items, while level-specific calendar content items are only displayed with respect to one or more content-variable view levels to which the level-specific (Continued)

calendar content items have been specifically linked, as determined by one or more user inputs.

20 Claims, 5 Drawing Sheets

(51) Int. Cl.
*G06F 3/0485* (2022.01)
*G06Q 10/10* (2012.01)
*G06Q 10/109* (2023.01)

(56) References Cited

U.S. PATENT DOCUMENTS

| | | | |
|---|---|---|---|
| 5,970,466 | A | 10/1999 | Detjen et al. |
| 6,978,271 | B1 | 12/2005 | Hoffman et al. |
| 7,305,491 | B2 | 12/2007 | Miller et al. |
| 7,318,040 | B2 | 1/2008 | Doss et al. |
| 7,325,198 | B2 | 1/2008 | Adcock et al. |
| 7,689,448 | B2 | 3/2010 | Fu et al. |
| 7,830,751 | B2 | 11/2010 | Parees et al. |
| 8,295,126 | B2 | 10/2012 | Wood et al. |
| 8,375,292 | B2 | 2/2013 | Coffman et al. |
| 8,434,026 | B2 | 4/2013 | Stewart et al. |
| 8,510,677 | B2 | 8/2013 | van Os |
| 8,538,992 | B1 | 9/2013 | Lawyer et al. |
| 8,607,250 | B2 | 12/2013 | Oral et al. |
| 8,713,435 | B2 | 4/2014 | Guan et al. |
| 9,195,972 | B2 | 11/2015 | Gopinath et al. |
| 9,292,482 | B1 | 3/2016 | Thiesen et al. |
| 9,438,649 | B2 | 9/2016 | Tallett |
| 9,843,895 | B2 | 12/2017 | Huang et al. |
| 10,032,135 | B2 | 7/2018 | Siu et al. |
| 10,140,324 | B2 | 11/2018 | Massarella et al. |
| 10,521,084 | B2 | 12/2019 | Anzures et al. |
| 10,586,216 | B2 | 3/2020 | Miller et al. |
| 10,769,132 | B1 | 9/2020 | Sharif et al. |
| 2003/0088427 | A1 | 5/2003 | Elsey et al. |
| 2004/0104937 | A1 | 6/2004 | An |
| 2005/0039142 | A1* | 2/2005 | Jalon ............... G06Q 10/109 715/963 |
| 2005/0050044 | A1 | 3/2005 | Takagi et al. |
| 2006/0136121 | A1 | 6/2006 | Eisen |
| 2007/0005409 | A1 | 1/2007 | Boss et al. |
| 2007/0150502 | A1 | 6/2007 | Bloebaum et al. |
| 2007/0180375 | A1 | 8/2007 | Gittelman et al. |
| 2007/0180377 | A1 | 8/2007 | Gittelman et al. |
| 2007/0186193 | A1 | 8/2007 | Curran |
| 2007/0300163 | A1 | 12/2007 | Alford et al. |
| 2008/0022201 | A1 | 1/2008 | Chen et al. |
| 2008/0059618 | A1 | 3/2008 | May et al. |
| 2008/0141145 | A1* | 6/2008 | Klausmeier ........ G06Q 10/109 715/751 |
| 2008/0162234 | A1 | 7/2008 | Lu et al. |
| 2008/0177609 | A1* | 7/2008 | Grieb ............... G06Q 10/109 705/7.18 |
| 2009/0040875 | A1 | 2/2009 | Buzescu et al. |
| 2009/0112986 | A1 | 4/2009 | Caceres |
| 2009/0168609 | A1 | 7/2009 | Weir et al. |
| 2010/0070888 | A1* | 3/2010 | Watabe ............. G06F 3/04815 705/5 |
| 2010/0075648 | A1 | 3/2010 | Matsuoka et al. |
| 2010/0162105 | A1 | 6/2010 | Beebe et al. |
| 2010/0175001 | A1 | 7/2010 | Lazarus et al. |
| 2010/0330974 | A1 | 12/2010 | Balannik et al. |
| 2011/0087707 | A1 | 4/2011 | Abraham |
| 2011/0216628 | A1 | 9/2011 | Nalla et al. |
| 2011/0252351 | A1 | 10/2011 | Sikora et al. |
| 2011/0264613 | A1 | 10/2011 | Yarvis et al. |
| 2011/0305437 | A1 | 12/2011 | Sakaguchi et al. |
| 2012/0084286 | A1 | 4/2012 | Hubner et al. |
| 2012/0197900 | A1 | 8/2012 | Mandre |
| 2012/0233563 | A1 | 9/2012 | Chakra et al. |
| 2013/0103658 | A1 | 4/2013 | Travis |
| 2014/0047312 | A1 | 2/2014 | Ruble et al. |
| 2014/0074536 | A1 | 3/2014 | Meushar et al. |
| 2014/0136263 | A1 | 5/2014 | Lee et al. |
| 2014/0156597 | A1 | 6/2014 | Hakami et al. |
| 2014/0330551 | A1 | 11/2014 | Bao et al. |
| 2014/0365951 | A1 | 12/2014 | Fernandes et al. |
| 2015/0156026 | A1 | 6/2015 | Gault et al. |
| 2015/0178690 | A1* | 6/2015 | May ............... G06Q 10/109 705/7.19 |
| 2015/0199077 | A1 | 7/2015 | Zuger et al. |
| 2015/0268839 | A1 | 9/2015 | Tallett |
| 2015/0294273 | A1 | 10/2015 | Barraci et al. |
| 2015/0347982 | A1 | 12/2015 | Jon et al. |
| 2015/0378619 | A1 | 12/2015 | Maeda et al. |
| 2015/0379413 | A1 | 12/2015 | Robertson et al. |
| 2015/0379476 | A1 | 12/2015 | Chaudhri et al. |
| 2016/0104119 | A1 | 4/2016 | Von et al. |
| 2016/0189111 | A1 | 6/2016 | Bookallil et al. |
| 2016/0203444 | A1 | 7/2016 | Frank et al. |
| 2016/0259761 | A1 | 9/2016 | Laborczfalvi |
| 2016/0275458 | A1 | 9/2016 | Meushar et al. |
| 2016/0350721 | A1 | 12/2016 | Comerford et al. |
| 2016/0364698 | A1 | 12/2016 | Bouz et al. |
| 2016/0370985 | A1 | 12/2016 | Tallett |
| 2017/0024705 | A1 | 1/2017 | Richardson et al. |
| 2018/0025323 | A1 | 1/2018 | Pintos |
| 2018/0077542 | A1 | 3/2018 | Xie et al. |
| 2018/0089632 | A1 | 3/2018 | Singh et al. |
| 2018/0095938 | A1 | 4/2018 | Monte |
| 2018/0114198 | A1 | 4/2018 | Ghotbi et al. |
| 2018/0189744 | A1 | 7/2018 | Frank et al. |
| 2018/0275846 | A1 | 9/2018 | Perret et al. |
| 2018/0336532 | A1 | 11/2018 | Hillery |
| 2018/0341924 | A1 | 11/2018 | Desportes et al. |
| 2019/0102370 | A1 | 4/2019 | Nelson et al. |
| 2019/0121994 | A1 | 4/2019 | Embiricos et al. |
| 2019/0155862 | A1 | 5/2019 | Yi et al. |
| 2020/0363910 | A1 | 11/2020 | Engrav et al. |
| 2020/0364199 | A1 | 11/2020 | Engrav et al. |
| 2020/0364673 | A1 | 11/2020 | Engrav et al. |
| 2021/0272069 | A1 | 9/2021 | Douglas et al. |
| 2022/0366376 | A1 | 11/2022 | Douglas et al. |

FOREIGN PATENT DOCUMENTS

| | | |
|---|---|---|
| CN | 105279637 A | 1/2016 |
| CN | 109344294 A | 2/2019 |
| WO | 2018212879 A1 | 11/2018 |

OTHER PUBLICATIONS

"Google Calendar", Retrieved from: https://www.google.com/calendar/about/, Retrieved Date: Feb. 11, 2021, 2 Pages.

"Using Date, Date/Time, and Time Values in Formulas", Retrieved from: https://help.salesforce.com/articleView?id=sf.formula_using_date_datetime.htm&type=5, Retrieved Date: Feb. 11, 2021, 4 Pages.

"Notice of Allowance Issued in U.S. Appl. No. 14/220,386", dated May 6, 2016, 18 Pages.

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

"Final Office Action Issued in U.S. Appl. No. 16/414,317", dated Jul. 1, 2020, 17 Pages.

"Non Final Office Action Issued in U.S. Appl. No. 16/414,317", dated Jan. 7, 2020, 15 Pages.

"Non Final Office Action Issued in U.S. Appl. No. 16/414,317", dated Oct. 27, 2020, 16 Pages.

"Notice of Allowance Issued in U.S. Appl. No. 16/414,317", dated Mar. 16, 2021, 9 Pages.

"Non Final Office Action Issued in U.S. Appl. No. 16/414,367", dated Jan. 13, 2021, 17 Pages.

"Notice of Allowance Issued in U.S. Appl. No. 16/414,367", dated Mar. 12, 2021, 16 Pages.

"Non Final Office Action Issued in U.S. Appl. No. 16/414,374", dated Sep. 8, 2020, 12 Pages.

(56) References Cited

OTHER PUBLICATIONS

Agnantis, et al., "Intelligent Calendar Applications: A Holistic Framework based on Ontologies", In International Journal of Artificial Intelligence, vol. 14, Issue 2, Oct. 2016, 21 Pages.
Cranshaw, et al., "Calendar.help: Designing a Workflow-Based Scheduling Agent with Humans in the Loop", In Repository of arXiv:1703.08428v1, Mar. 24, 2017, 12 pages.
Hinnant, Howard, "Chrono-Compatible Low-Level Date Algorithms", Retrieved From: https://howardhinnant.github.io/date_algorithms.html, Sep. 7, 2013, 24 Pages.
Krzywicki, et al., "Closed Pattern Mining for the Discovery of User Preferences in a Calendar Assistant", In Book of New Challenges in Applied Intelligence Technologies, Jan. 2008, 11 Pages.
Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.
"International Search Report and Written Opinion Issued in PCT Application No. PCT/US20/028027", dated Jul. 20, 2020, 11 Pages.
"International Search Report and Written Opinion Issued in PCT Application No. PCT/US20/028029", dated Jul. 23, 2020, 11 Pages.
"International Search Report and Written Opinion Issued in PCT Application No. PCT/US20/028030", dated Jun. 2, 2020, 11 Pages.
"Notice of Allowance Issued in U.S. Appl. No. 16/414,374", dated Jun. 23, 2021, 9 Pages.
Date-Constrained Google Search Result for "Universal Time" and "Coordinated Universal Time", obtained by Examiner on Mar. 10, 2022 from Google Search Engine, 2019, 2 Pages.
"How to Convert UTC Time to Local Time", Retrieved from: https://web.archive.org/web/20210209121703/https://support.microsoft.com/en-us/topic/how-to-convert-utc-time-to-local-time-0569c45d-5fb8-a516-814c-75374b44830a, Dec. 8, 2015, 3 Pages.
"Time Configuration", Retrieved from: https://docs.servicenow.com/bundle/sandiego-platform-administration/page/administer/core-configuration/concept/p_Time.html, Jul. 15, 2015, 2 Pages.
"Non Final Office Action Issued in U.S. Appl. No. 17/320,991", dated Apr. 1, 2022, 13 Pages.
"Notice of Allowance Issued in U.S. Appl. No. 17/321,093", dated Mar. 21, 2022, 9 Pages.
"Non Final Office Action Issued in U.S. Appl. No. 17/321,093", dated Jun. 3, 2022, 21 Pages.
"How to Translate UTC to your Time", Retrieved from: https://earthsky.org/astronomy-essentials/universal-time/, Jan. 1, 2018, 6 Pages.
"Use Google Calendar in Different Time Zones", Retrieved From: https://support.google.com/calendar/answer/37064?nl=en&co=GENIE.Platform%3DDesktop, Retrieved Date: May 3, 2022, 01 Page.
"International Search Report and Written Opinion Issued in PCT Application No. PCT/US22/024180", dated Jun. 1, 2022, 17 Pages.
"International Search Report & Written Opinion issued in PCT Application No. PCT/US22/024182", dated Jul. 11, 2022, 13 Pages.
"International Search Report & Written Opinion issued in PCT Application No. PCT/US22/024321", dated Jul. 8, 2022, 13 Pages.
"Notice of Allowance Issued in U.S. Appl. No. 17/320,991", dated Aug. 19, 2022, 5 Pages.
"Office Action Issued in European Patent Application No. 20723715.7", dated Sep. 6, 2022, 8 Pages.
"First Office Action Issued in U.S. Appl. No. 17/321,093", dated Dec. 9, 2022, 19 Pages.
"Notice of Allowance Issued in U.S. Appl. No. 17/321,093", dated Feb. 7, 2023, 12 Pages.
U.S. Appl. No. 16/414,374, filed May 16, 2019.
U.S. Appl. No. 17/321,093, filed May 14, 2021.
U.S. Appl. No. 16/414,317, filed May 16, 2019.
U.S. Appl. No. 16/414,367, filed May 16, 2019.
U.S. Appl. No. 17/320,991, filed May 14, 2021.
"Notice of Allowance Issued in European Patent Application No. 20723715.7" dated Mar. 2, 2023, 8 Pages.

* cited by examiner

MAP CALENDAR GRAPHICAL USER INTERFACE WITH CONTENT-VARIABLE VIEW LEVELS

BACKGROUND

The present disclosure relates to calendar applications. In particular, the present disclosure relates to a map calendar application that provides a map calendar graphical user interface (GUI) with content-variable view levels.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for implementing a map calendar graphical user interface (GUI) including content-variable view levels in a computing system including a processor and a display operatively coupled to each other is described. The method includes executing, via the processor, a map calendar application on the computing system to provide the map calendar GUI surfaced on the display, the map calendar GUI including interactive visualizations of a map calendar that includes a continuous, manipulable sequence of data organized as units of time within a coordinate plane, where the interactive visualizations are organized into content-variable view levels of the map calendar that relate to specific units of time within the coordinate plane. The method includes displaying, via the surfaced map calendar GUI, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The method includes receiving, via the surfaced map calendar GUI, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The method also includes receiving, via the surfaced map calendar GUI, a second user input representing a second command to navigate from the first zoom level and the first panning position of the map calendar to at least one of a second zoom level or a second panning position of the map calendar. The method further includes displaying, via the surfaced map calendar GUI, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

In another embodiment, a computing system is described. The computing system includes a processor and a display operatively coupled to the processor. The computing system also includes a computer-readable storage medium operatively coupled to the processor, the computer-readable storage medium including computer-executable instructions that, when executed by the processor, cause the processor to execute a map calendar application on the computing system to provide a map calendar graphical user interface (GUI) surfaced on the display, the map calendar GUI including interactive visualizations of a map calendar that includes a continuous, manipulable sequence of data organized as units of time within a coordinate plane, wherein the interactive visualizations are organized into content-variable view levels of the map calendar that relate to specific units of time within the coordinate plane. The computer-executable instructions, when executed by the processor, also cause the processor to display, via the map calendar GUI surfaced on the display, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The computer-executable instructions, when executed by the processor, also cause the processor to receive, via the map calendar GUI surfaced on the display, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The computer-executable instructions, when executed by the processor, also cause the processor to receive, via the map calendar GUI surfaced on the display, a second user input representing a second command to navigate from the first zoom level and the first panning position of the map calendar to at least one of a second zoom level or a second panning position of the map calendar. The computer-executable instructions, when executed by the processor, further cause the processor to display, via the map calendar GUI surfaced on the display, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

In another embodiment, a computer-readable storage medium is described. The computer-readable storage medium includes computer-executable instructions that, when executed by a processor of a computing system, cause the processor to execute a map calendar application to provide a map calendar graphical user interface (GUI) surfaced on a display that is operatively coupled to the processor, the map calendar GUI including interactive visualizations of a map calendar that includes a continuous, manipulable sequence of data organized as units of time within a coordinate plane, where the interactive visualizations are organized into content-variable view levels of the map calendar that relate to specific units of time within the coordinate plane. The computer-executable instructions, when executed by the processor, also cause the processor to display, via the surfaced map calendar GUI, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The computer-executable instructions, when executed by the processor, also cause the processor to receive, via the surfaced map calendar GUI, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The computer-executable instructions, when executed by the processor, also cause the processor to receive, via the surfaced map calendar GUI, a second user input representing a second command to navigate from the first zoom level and the first panning position of the map calendar to at least one of a second zoom level or a second panning position of the map calendar. The computer-executable instructions, when executed by the processor, further cause the processor to display, via the surfaced map calendar GUI, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1A:
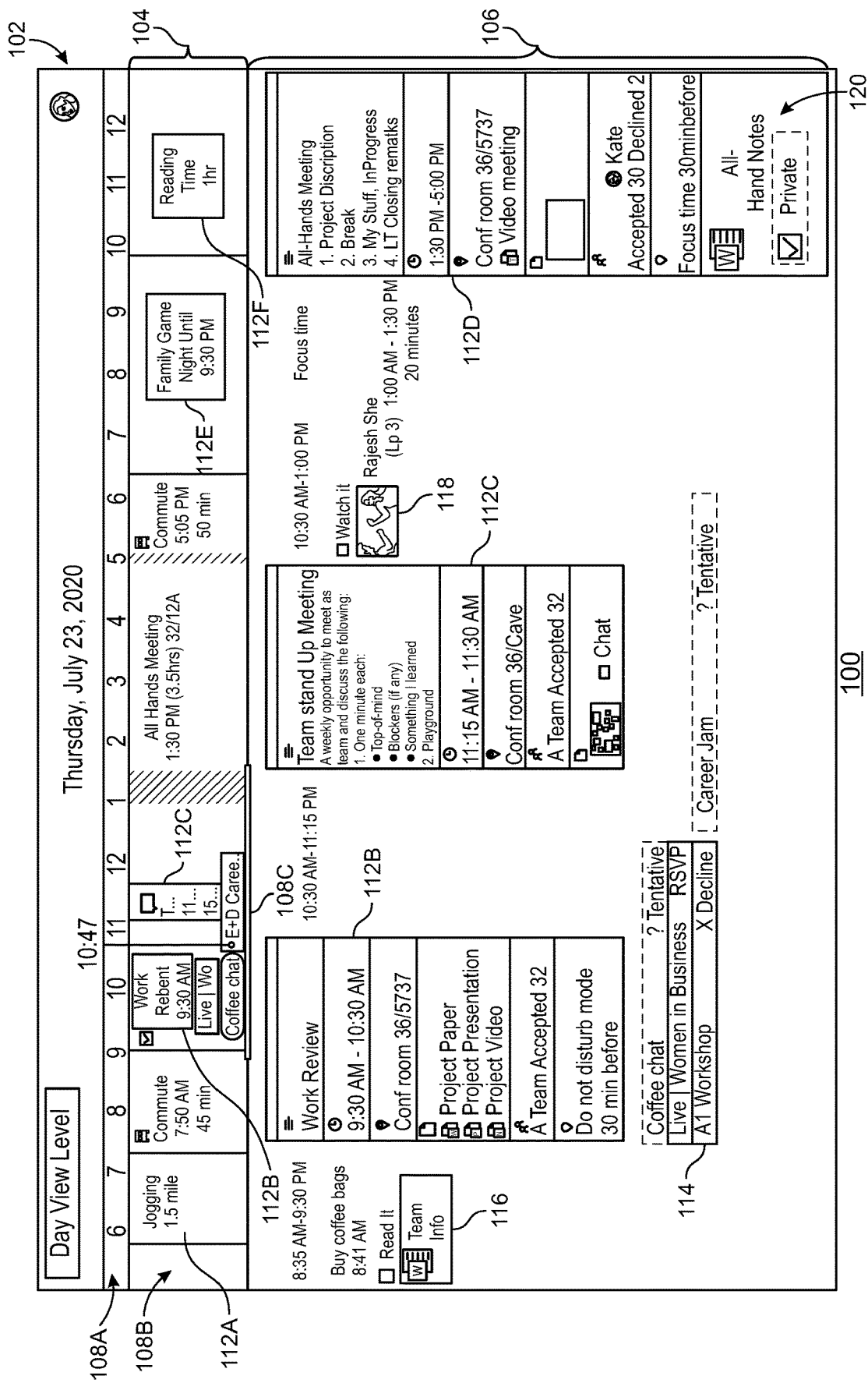
FIG. 1A is a schematic view showing an exemplary day view level of a map calendar, as visualized on the display of a computing system via a map calendar graphical user interface (GUI)

According to conventional electronic calendar applications, an electronic calendar is typically presented to the user of a computing system in the form of a graphical user interface (GUI) that allows the user to visualize the electronic calendar based on different view levels that correspond to particular units of time, e.g., generally including groupings of days, weeks, months, or years. Moreover, the GUI also allows the user to interact with the electronic calendar to add events and/or other calendar content items corresponding to the specific units of time within the electronic calendar. For example, the user may add an event that corresponds to a particular day or an event that spans across an entire week or month. In either case, the electronic calendar application incorporates the event into the user's electronic calendar such that the event exists within the electronic calendar across all units of time. Accordingly, when the user adds an event to a particular day, the event exists within the electronic calendar, not only with respect to that particular day, but also with respect to the corresponding week, month, and year. Therefore, when the user visualizes the electronic calendar via the GUI, the user views different representations of the same set of events. However, this rigid electronic calendar format is generally not representative of the manner in which users actually view time. Instead, users view time as a complex combination of experiences, where each week is not merely the sum of all the days within that week and each month is not merely the sum of all the weeks within that month, for example. Conversely, users may view each day as a distinct unit of time that is not accurately represented by the week encompassing that day and each week as a distinct unit of time that is not accurately represented by the month encompassing that week, for example. Accordingly, because conventional electronic calendar applications provide users with different representations of the same sets of events across all view levels, such calendar applications are generally not optimized based on users' actual expectations and experiences with respect to time.

The present techniques solve this issue by providing a map calendar application including a map calendar graphical user interface (GUI) with content-variable view levels. In various embodiments, the map calendar GUI provides an electronic representation of time as a map calendar including a continuous, manipulable sequence of data organized as units of time within a coordinate plane. In some embodiments, the coordinate plane includes a first axis (e.g., an X-axis) that represents time and a second axis (e.g., a Y-axis) that represents partitions of calendar content items according to a calendar content type. However, the coordinate plane may also be arranged in any other suitable manner, depending on the details of the particular implementation.

In various embodiments, the manipulation of the map calendar via the map calendar GUI enables real-time shifting and/or conversion of the units of time used to render calendar content items, where such calendar content items may include, but are not limited to, events, media content (e.g., photographs, audio, video, and/or animations), social networking blurbs (such as social status updates and tweets), links (e.g., links to other applications, web-browsing history, reminders, and/or documents. In addition, in various embodiments, the map calendar GUI enables the map calendar to be panned, meaning that the user can scroll across the map calendar as though moving across a panorama. Moreover, in various embodiments, the map calendar GUI enables the map calendar to be zoomed, meaning that the user can zoom in or zoom out to view time at different view levels, where each view level includes groupings of different units of time.

Furthermore, in various embodiments, the map calendar application includes functionality that enables calendar content items to be associated with one or more specific view levels, while not being associated with other view levels that encompass the same units of time. For example, an event that is added to a particular day within the day view level may be associated with that particular day without being associated with the week or month encompassing that day, as desired by the user. As a result, when the user views the map calendar via the map calendar GUI, the event will show up within the day view level but will not show up when the user zooms out to the week view level. As another example, an event that is added to a particular week within the week view level may be associated with that particular week without being associated with the month encompassing that week and/or the days that are encompassed by that week, as desired by the user. As a result, when the user views the map calendar via the map calendar GUI, the event will show up within the week view level but will not show up when the user zooms out to the month view level or zooms in to the day view level. Accordingly, embodiments described herein allow users to view and interact with their electronic calendars in a seamless, flexible manner that is representative of the manner in which users actually experience time.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

Exemplary Map Calendar Application and Corresponding Map Calendar GUI Including Content-Variable View Levels The map calendar application described herein enables particular calendar content items to be explicitly associated with one or more specific content-variable view levels within the corresponding map calendar, according to the preferences of the user of the computing system. In various embodiments, this is accomplished via user interaction with the map calendar GUI described herein, which is a machine-user interface including an interactive visualization of the map calendar that allows the user to visualize and interact with the map calendar through graphical elements, icons, and the like rendered on the display of the computing system. By explicitly associating particular calendar content items with specific content-variable view levels in this manner, the user is provided with variable views of different units of time that more closely represent the manner in which the user actually experiences time.

Furthermore, in some embodiments, the map calendar application may automatically associate particular calendar content items with one or more specific content-variable view levels without explicit user input. For example, if a particular content-variable view level of the map calendar is very sparse, meaning that there are very few calendar content items for the unit of time that is encompassed by the content-variable view level, the map calendar application may automatically include the calendar content items in the content-variable view level to avoid the situation in which the content-variable view level appears empty (or nearly empty), at which point it is of little to no value to the user.

It should be noted that, while the term "view level" is used with reference to the user visualization provided by the map calendar GUI, such view levels are enabled by the underlying map calendar application itself, which is configured with multilevel data storage. In other words, the map calendar application is configured to store calendar content data such that data corresponding to particular calendar content items are associated with any number of specific units of time within the map calendar, where each unit of time (or grouping of units of time) may be presented to the user as a particular view level via the map calendar GUI. Accordingly, the present techniques provide additional functionality as compared to calendar applications that merely hide particular events from specific views for the purpose of saving space within the visualization (e.g., calendar applications that show fewer events within the week view as compared to the day view). Specifically, the present techniques enable the creation and presentation of different calendar view levels with distinct underlying calendar content data that are managed by the map calendar application. In this manner, each view level can be independently managed and modified by the user without affecting the other view levels. Moreover, while the view levels include some amount of distinct calendar content data, the view levels nevertheless remain linked within the map calendar application such that the user is still able to add standard, non-level-specific calendar content items to the map calendar and have those calendar content items show up across all relevant view levels.

In various embodiments, the map calendar application described herein is configured to automatically configure and display (i.e., via the map calendar GUI) appropriate view levels as the user zooms and pans across the map calendar. For example, if the user zooms in on a particular day (or any portion thereof), the map calendar GUI may automatically display the day view level corresponding to that day. If the user then quickly zooms out such that a particular week (or any multi-day portion thereof) is shown, the map calendar GUI may automatically display the week view level corresponding to that week. Similarly, if the user pans across the map calendar such that a different week (or multi-day portion thereof) is shown, the map calendar GUI may automatically display the week view level corresponding to the newly-displayed week.

Moreover, in some embodiments, the map calendar application is configured to activate or deactivate the content-variable view level functionality based on user input. As an example, if the user is planning to share his screen with another user, the user may wish to hide personal/private calendar content items that are included within a particular day view level. As another example, in some cases, the user may wish to temporarily view only non-level-specific calendar content items across all units of time within his map calendar in order to, for example, analyze his overarching schedule without any extra information cluttering the view. In this case, the user may temporarily deactivate the content-variable view level functionality via an appropriate toggle, drop-down menu, or the like that is provided by the map calendar GUI.

In some embodiments, the specific view levels for calendar content items are designated by the user as such calendar content items are added to the user's map calendar. In other words, when the user adds a calendar content item to the user's map calendar, the user may designate whether the calendar content item is to be associated with the overarching map calendar (i.e., across all view levels) or to one or more specific view levels. Those skilled in the art will appreciate that this may be accomplished via user interaction with the map calendar GUI in any suitable manner, depending on the details of the particular implementation. For example, in some embodiments, the default setting may be to associate calendar content items with the overarching map calendar. Therefore, if the user wishes to add a calendar content item that is associated with a specific view level and does not show up on other view levels, the user may select the desired view level option from a drop-down menu, for example, corresponding to that calendar content item.

The map calendar application described herein enables various functionalities that are not enabled by conventional calendar applications. Specifically, taking the day view level as an example, the map calendar application enables the user (via interaction with the map calendar GUI) to, for example, add calendar content items to their day that are not actual calendar events and/or are not associated with a specific time. Moreover, the map calendar application is configured to link those particular calendar content items to the day view level such that the day view level includes detailed, granular calendar information that is not linked to other view levels. Such calendar information may include, for example, details corresponding to events that the user desires to document for future reference, events that were declined by the user, buffer time spent going to and from particular events, heterogenous calendar content items that the user simply drops onto the timeline for the day, pictures from the user's camera roll that are automatically linked to the time at which they were taken, links to documents or webpages that the user viewed that day, and/or floating calendar content items that are not anchored to a specific time range.

Continuing with the day view level example, the user may utilize the detailed, granular calendar information existing within the day view level to optimize the utilization of their time and the organization of their schedule in various ways. As an example, the user may utilize the day view level as a digital space for offloading or recording any thoughts or information that they do not desire to see at other view levels within their overarching calendar. As another example, the user may utilize the day view level to make cognitive connections between various floating calendar content items that the user added throughout the day. As another example, the user may utilize the day view level to determine appropriate changes to their schedule based on various calendar content items that only make sense within the context of the particular day. As another example, the user may specify that calendar content items (e.g., events) received from one or more specific users are to be associated with only the day view level and, as a result, may be able to view such calendar content items with respect to the day view level without cluttering their week view level or month view level.

Furthermore, those skilled in the art will appreciate that the content-variable view levels provided by the map calendar GUI described herein enable various user scenarios that are not enabled by the rigid electronic calendar format provided by conventional calendar GUIs. As an example, a user may view a particular day at the day view level within the user's map calendar and see that they declined a team meeting with coworkers in order to accept a one-on-one meeting with another coworker. The user may then pan across the map calendar to view another day at the day view level and see that they recently declined another team meeting with coworkers in order to accept another one-on-one meeting. Because the user is able to view both accepted and declined meetings at the day view level, the user may be able to recognize a pattern of often scheduling one-on-one meetings at the same time that they are expected to attend team meetings. This recognition may, in turn, allow the user to modify future scheduling behavior such that the user is able to attend both team meetings and one-on-one meetings.

As another example, the user may be asked to read a relevant document before going into a work meeting in the afternoon. Therefore, the user may drop the document into their map calendar as a floating calendar content item that exists within the morning at the day view level, within close proximity to a scheduled appointment that morning. The user may then take a bus to get to the appointment. During the bus ride, the user may see the document floating within the user's map calendar at the day view level and, as a result, decide to open and read the document while on the bus.

As another example, the user may plan a week-long trip to a vacation destination. The user may create a standard, non-level-specific calendar event for the trip that spans across the entire week in all view levels of the calendar. As a result, when the user views the map calendar at the month view level, the user may see the trip itself as an actual event within the calendar. However, the user may associate potential ideas for the trip, such as restaurants, museums, and hotels of interest, with the week view level. Accordingly, when the user views his map calendar at the week view level, the map calendar GUI may provide the user with a richer experience including all the user's ideas and plans for the trip. Moreover, if friends later recommend particular tourist sites for the trip, the user may be able to quickly open the map calendar at the week view level and add notes about the recommended tourist sites as floating calendar content items within the week. Then, the user may easily refer to those ideas later when the user is ready to finalize the trip itinerary.

As another example, a user may decide to get groceries on a particular day. Accordingly, the user may drop a shopping list into the user's map calendar as a floating calendar content item that exists at the day view level. Later, the user may look at the day view level and see that lunch with a friend is scheduled at noon. Therefore, the user may decide to drag and drop the shopping list into the early afternoon as a reminder to go grocery shopping right after lunch is over.

As another example, the user may decide to record a virtual work meeting for future reference. Then, once the meeting is over, the user may drag and drop the recorded video into the user's map calendar at the day view level, either within the work meeting event or in close proximity to the work meeting event within the calendar, thus enabling the user to quickly and easily locate the video later.

In some embodiments, the user may also utilize the content-variable view levels described herein to record calendar content items that are not only independent from other view levels of the user's map calendar but are also independent of all other users' map calendars. For example, in some embodiments, the user may receive an invitation to attend a meeting event that was organized by another user. At that point, the map calendar GUI will allow the user to see a visualization of the shared meeting information. Such shared meeting information may include, for example, a title, date, location, and/or agenda for the meeting, as well as an identity of the organizer and a list of invitees (along with whether they accepted or declined the meeting invitation). However, in some cases, the user may wish to add information to the meeting event within his calendar that is not shared with any other users. As an example, the user may want to add private notes to the meeting event before, during, and/or after the meeting. As another example, the user may want to attach a document to the meeting event as a reminder to read the document before going into the meeting. As another example, the user may want to change the title of the meeting event in a manner that makes it more findable, searchable, and/or personalized from the user's perspective.

Unfortunately, within conventional calendar applications, any updates to a shared meeting event (or other shared calendar content item) are generally synced across (and, thus, visible to) all users who have the meeting event saved on their calendars. Moreover, while a user may sometimes be able to edit the meeting title and/or agenda locally, such changes are overwritten and lost if another user (e.g., generally the organizer) updates the meeting information and syncs those updates across all users. Accordingly, in various embodiments, the user may utilize the content-variable view levels described herein to save private calendar content data corresponding to particular view levels (e.g., particular units of time) within the user's personal map calendar. This may be accomplished, at least in part, by the implementation of a sync-and-merge solution in which any local changes to a shared meeting event (or other shared calendar content item) are merged with newly updated/propagated changes from other users such that no information is lost and the user's private changes remain within his personal map calendar even after updates have been synced across all users.

The following is a description of an exemplary implementation of the map calendar GUI to render corresponding day and week view levels on the display of a computing system, where each view level includes variable calendar content based on the preferences of the user. Those skilled in the art will appreciate that this exemplary implementation of the map calendar GUI is for illustrative purposes only. In practice, the map calendar GUI may be implemented in any other suitable manner based on the details of the particular implementation.

FIG. 1A is a schematic view showing an exemplary day view level 100 of a map calendar, as represented via a map calendar GUI. In various embodiments, the map calendar GUI provides the rendering of the map calendar on the display of an electronic device, such as the computing system described with respect to FIG. 3. Moreover, the map calendar GUI enables the user to interact with the map calendar and manipulate the visualization of the map calendar in various ways. In general, manipulation of the map calendar may be defined as a continuous movement of the calendar view via panning across the map calendar and/or zooming in or out of the map calendar. The manipulation of the map calendar can result in the addition of calendar content to the calendar view, or the manipulation can result in the subtraction of calendar content from the calendar view. Moreover, the manipulation of the map calendar may result in any combination of addition or subtraction of the calendar content, where the rendered calendar content is updated in response to the manipulation in a seamless, visually unbroken manner.

For example, a user may pan or scroll along an axis of time presented by the map calendar. In this manipulation, content is added to and subtracted from the calendar view as the view changes to render future or past calendar content at differing times according to the same unit of time. A user may also zoom in or zoom out of a time representation presented by the calendar view. In various embodiments, a zoom-in function results in increasingly smaller units of time rendered by the map calendar. Conversely, a zoom-out function results in increasingly larger units of time rendered by the map calendar. In a zoom-type manipulation, content is added to or subtracted from the calendar view as the view changes to render future or past calendar content at substantially the same points in time, using differing units of time. In this manner, the map calendar GUI provides a dynamic organization of time that can be manipulated by the user. Moreover, the organization of time enabled by the map calendar GUI is not limited by the particular format of the calendar system. In particular, the units of time may be according to any calendar system or combination of calendar systems.

Generally, the map calendar GUI organizes the calendar content for the map calendar according to a coordinate plane. The coordinate plane may include a horizontal axis and a vertical axis, where the horizontal axis and the vertical axis are perpendicular to each other. The horizontal axis may be generally referred to as the X-axis, and the vertical axis may be generally referred to as the Y-axis. In some embodiments, the X-axis of the map calendar represents time. For example, as shown in FIG. 1A, a time value may increase when moving from left to right along the X-axis of the map calendar. However, in other embodiments, time may additionally or alternatively be organized along the Y-axis, as described with respect to FIG. 1B. Therefore, the map calendar according to the present techniques should not be viewed as limited by a particular axis of the coordinate plane. Moreover, the remaining axis (i.e., the axis other than the axis used to represent time) is not limited to the representation of a particular value. The remaining axis can be modified according to rules and user preferences. In some embodiments, the remaining axis is used to display detailed information regarding specific calendar content items and/or to partition the calendar content items according to calendar content types, where the term "calendar content type" refers to a category associated with a calendar content item. Such calendar content types may include, but are not limited to, particular locations, people, sources, and/or levels of time. Moreover, in some embodiments, the X-axis and/or the Y-axis may be further broken up into smaller intervals such that more detailed information can be shown via the map calendar GUI. For example, according to the embodiment shown in FIG. 1A, the X-axis represents time based on both hours (in the top section) and minutes (in the bottom section) so that the user is able to view an overview of the day as well as more detailed information for particular portions of the day, as described further herein.

As shown in FIG. 1A, the view of the map calendar provided by the map calendar GUI may include a label section 102, a header section 104, and an event section 106. For ease of description, the label section 102, the header section 104, and the event section 106 are positioned in a certain layout. In particular, the label section is illustrated at the top of the rendered map calendar, with the header section 104 immediately below the label section 102. Further, the event section 106 is illustrated as immediately below the header section 104. However, the present techniques are not limited to the particular layout illustrated in FIG. 1A. Rather, the label section 102, the header section 104, and the event section 106 can be positioned at any location in the rendered map calendar. Moreover, some sections may be hidden or otherwise removed from the map calendar.

In the illustration of FIG. 1A, the label section 102 provides labels or names associated with the particular unit of time presently rendered by the map calendar. For example, the label section 102 of FIG. 1A is illustrated as including the day of Thursday, Jul. 23, 2020. Accordingly, the map calendar GUI shows a visualization of events that occur during the day of Thursday, Jul. 23, 2020. Moreover, the map calendar GUI is configured to automatically update the label section 102 in response to the user manipulating the calendar view within the event section 106. Accordingly, the label section 102 enables a dynamic labeling function that corresponds to the unit of time rendered in the calendar view. Additionally, the label rendered by the label section 102 may be approximate, where the label to be rendered is selected based on a closest or nearest unit of time rendered in the calendar view.

According to the embodiment shown in FIG. 1A, the header section 104 renders the particular units of time along the X-axis. In particular, the header section 104 is illustrated as including a first header portion 108A with header blocks that include hourly increments of time. In addition, the header section 104 is illustrated as including a second header portion 108B that is a mini-map of at least a portion of the unit of time indicated by the label section 102. In this manner, the header section 104 further segments the period of time indicated by the label section 102.

In various embodiments, the event section 106 includes various calendar content items associated with the particular period of time indicated by the label section 102. For example, according to the embodiment shown in FIG. 1A, the event section 106 includes calendar content items that occur within the map calendar on Thursday, Jul. 23, 2020 within a time frame that is indicated by a sliding header bar 108C corresponding to the header section 104. Such calendar content items may include, but are not limited to, events (such as meeting events, for example), media content (such as photographs, audio, video, animations, social networking blurbs (such as social status updates and tweets), links (such as links to other applications), web-browsing history, reminders, documents, and the like. Calendar content items may also include applications that are embedded in the calendar surface. Applications embedded in the calendar surface execute within execution context of the map calendar. In various embodiments, executing an application within the execution context of the map calendar does not require the opening and execution of the application outside of the map calendar GUI. For example, a drawing application may be considered a calendar content item. The drawing application enables a user to share drawings with other users of the map calendar application. The drawing functionality may be executed within the map calendar application, without opening a separate instance of the drawing application. Further, calendar content items can also include "To-Do" items or "Task" items, which are generally calendar content items that indicate to the user that a specific action that should be taken by the user prior to a specific deadline. By contrast, an event is a circumstance which may or may not include a specific action associated with a general time frame. The To-Do and Task items can be rendered in a list format, where a user can revise the To-Do and Task items to reflect progress made by the user on completing the items.

Generally, some events may have well defined start and stop times, whereas other events are associated with a general time. In various embodiments, calendar content items that are not anchored to a specific time range are referred to as "floating calendar content items."

In various embodiments, calendar content items can have relationships with other calendar content items. The event relationships, the pan level, and the zoom level are factors in how events are rendered in the event section 106. In particular, the relationships, pan level, and zoom level can be used to enable semantic and intelligent summarization of the calendar content items.

According to the embodiment shown in FIG. 1A, the event section 106 is further broken up into two separate sections. Specifically, the event section 106 includes an upper section 108A that represents the day according to hours, as well as a lower section 108B that represents a portion of the day according to minutes. In this manner, the map calendar GUI enables the user to zoom in on particular portions of the day within the lower section 108B, while still viewing a general overview of the day in the upper section 108A. Moreover, in some embodiments, the map calendar GUI may provide a guide 110 or other interactive element corresponding to the upper section 108A that allows the user to select which portion of the day to display in the lower section 108B.

Furthermore, according to embodiments described herein, the map calendar GUI enables the map calendar to be displayed at different content-variable view levels, where each view level includes any combination of non-level-specific calendar content items (which are represented across all corresponding view levels) and level-specific calendar content items (which are only included within one or more specific view levels). As an example, the day view level 100 of the map calendar for Thursday, Jul. 23, 2020 is shown in FIG. 1A, where the day view level includes a visualization of both non-level-specific and level-specific calendar content items corresponding to Thursday, Jul. 23, 2020. For example, a "Jogging" event 112A, a "Work Review" event 112B, a "Team Stand Up Meeting" event 112C, an "All-Hands Meeting" event 112D, a "Family Game Night" event 112E, and a "Reading Time" event 112F (among other events) are included within the day view level 100 as standard, non-level-specific calendar content items that are represented in various forms across all corresponding view levels within the map calendar. However, an "AI Workshop" event 114, which is an event that was declined by the user, is included as a level-specific event that is only shown within the day view level 100. In this manner, the user is able to easily see any meeting events (or other types of events) that they declined without such events cluttering their overarching map calendar, as shown at the week view level, month view level, and the like. Moreover, the user may then utilize this information to enable more informed scheduling decisions in the future.

Furthermore, the day view level 100 may also include any number of other level-specific calendar content items. For example, according to the embodiment shown in FIG. 1A, the day view level 100 includes a "Team Info" document 116 as a floating, level-specific calendar content item that exists within close proximity to the user's morning commute time. In some embodiments, the user may drag and drop the document at that location as a reminder to read the document before the "All-Hands Meeting" event 112D that afternoon. As another example, the day view level 100 includes a video 118 as a floating, level-specific calendar content item that exists within close proximity to the user's typical lunch break. In this manner, the user may prepopulate the map calendar with videos or other media items that they would like to view during certain times of the day, without such media items cluttering their overall map calendar. Moreover, as another example, the day view level 110 includes an "All-Hands Notes" document 120 as a private, level-specific calendar content item that exists within the "All-Hands Meeting" event 112D but is not shared with other users. In this manner, the user is able to store private calendar content data within the day view level 100, even when such data relate to a shared calendar content item.

Figure 1B:
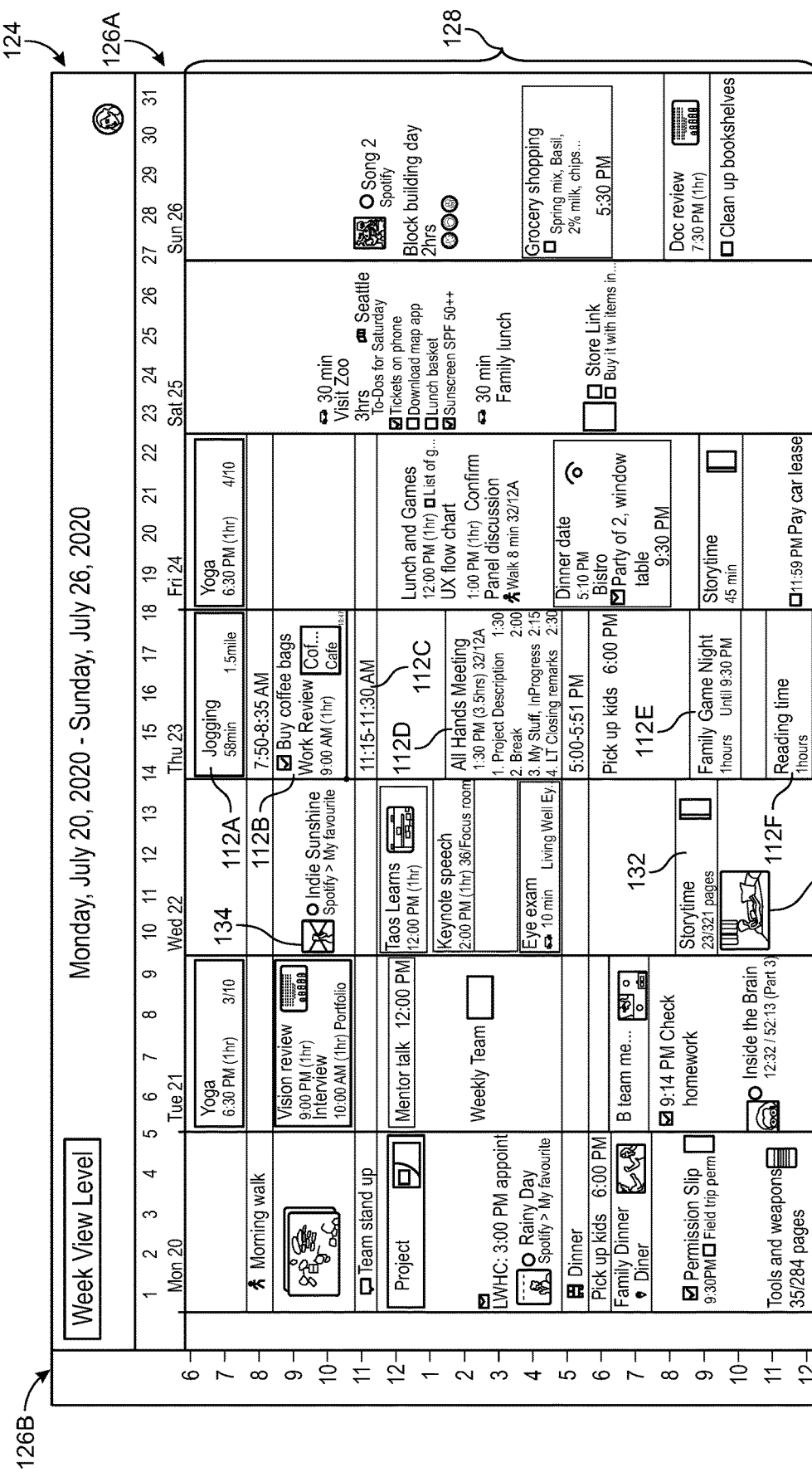
FIG. 1B is a schematic view showing an exemplary week view level of the map calendar, as visualized on the display of the computing system via the map calendar GUI.

FIG. 1B is a schematic view showing an exemplary week view level 122 of the map calendar, as represented via the map calendar GUI. As shown in FIG. 1B, the week included within the week view level 122 of FIG. 1B encompasses the day corresponding to the day view level 100 of FIG. 1A. Specifically, the week of Monday, Jul. 20, 2020 through Sunday, Jul. 26, 2020 is shown, as indicated by the label in a label section 124 of the calendar view.

According to the embodiment shown in FIG. 1B, the map calendar is arranged in a slightly different format from the format shown in FIG. 1A. Specifically, both the X-axis and the Y-axis are used to render particular units of time in a first header section 126A and a second header section 126B of the calendar view, respectively. As shown in FIG. 1B, the first header section 126A includes the specific day of the week that is being displayed (in ascending order from left to right), while the second header section 126B includes the time (e.g., hour) of day (in ascending order from top to bottom). As a result, an event section 128 of the calendar view is also arranged differently from the event section 106 of FIG. 1A. In particular, the event section 128 includes calendar content items for each day within the week, arranged based on the time of day as indicated by the second header section 126B.

In various embodiments, the week view level 122 of FIG. 1B includes a visualization of both non-level-specific and level-specific calendar content items corresponding to the week of Monday, Jul. 20, 2020 through Sunday, Jul. 26, 2020. As an example, a number of non-level-specific events, such as the events 112A-F described with respect to FIG. 1A, are included within the week view level 122. As another example, links to level-specific media content (such as, for example, a link to a favorite image 130 from a "Storytime" event 132 and/or a link to a favorite song 134 from a playlist) may be included within the week view level 122 (and, optionally, the corresponding day view level 100), without being included within the corresponding year or multi-year view levels.

Moreover, in various embodiments, any number level-specific calendar content items included within the corresponding day view levels (i.e., including the day view level 100) are not included within the week view level 122. For example, the "AI Workshop" event 114, the "Team Info" document 116, and the video 118 described with respect to FIG. 1A are not included within the week view level 122 of FIG. 1B, since those calendar content items are level-specific calendar content items that are only included within the day view level corresponding to Thursday, Jul. 23, 2020. Furthermore, those skilled in the art will appreciate that the present techniques can be extended to any number of additional examples or embodiments in which calendar content items are selectively associated with one or more calendar view levels, without being associated with the other view levels within the calendar. In this manner, the present techniques allow users to view and interact with their electronic calendars in a seamless, flexible manner that is representative of the manner in which users actually experience time.

For ease of description, embodiments described herein are illustrated with reference to a map calendar GUI displaying a map calendar with respect to the Gregorian calendar system. However, the present techniques are not limited to a particular calendar system but, rather, may be implemented with respect to any suitable calendar system. Examples of particular calendar systems that may be used according to the present techniques include, but are not limited to, lunar calendar systems, solar calendar systems, religious calendar systems, and/or specific national calendar systems. Examples of other, more specific calendar systems that may be used according to the present techniques include, but are not limited to, the Julian calendar system, the Islamic calendar system, the Hindu calendar system, the Buddhist calendar system, the Hebrew calendar system, and/or the Baha'i calendar system. In addition, non-traditional and/or custom calendar systems may also be used according to the present techniques. For example, a calendar system corresponding to a fiscal year for a particular company or organization may be used. As another example, school and/or college calendar systems may be used, in which case the calendar year may be broken into customized semesters or quarters based on the academic calendar of the particular school or college. Moreover, individual time zones may be regarded as specific calendar systems. For example, for users located within North America, there may be calendar systems corresponding to the Pacific Time Zone, the Mountain Time Zone, the Central Time Zone, and the Eastern Time Zone. Furthermore, calendar systems with values that frequently change may also be used, such as, for example, the daylight savings calendar system and/or the Japanese calendar system. As will be appreciated by those skilled in the art, any number of calendar systems may also be combined into a single calendar system, depending on the details of each particular implementation.

Moreover, while the map calendar application is described herein with reference to a map calendar GUI that includes content-variable day view levels, week view levels, and year view levels, the present techniques are not limited to these particular types of view levels. Rather, those skilled in the art will appreciate that the particular types of content-variable view levels represented by the map calendar GUI will vary based on the particular calendar system used. For example, if a college calendar system is used, examples of suitable content-variable view levels may include a semester view level and an academic year view level. Furthermore, in some embodiments, a particular view level, such as, for example, a day view level, may be further broken up into multiple view levels including smaller units of time, such as, for example, an hour view level. Therefore, a content-variable view level according to embodiments described herein may include any particular unit of time for which the user desires to provide content that is not included within one or more other view levels corresponding to other units of time.

Figure 2:
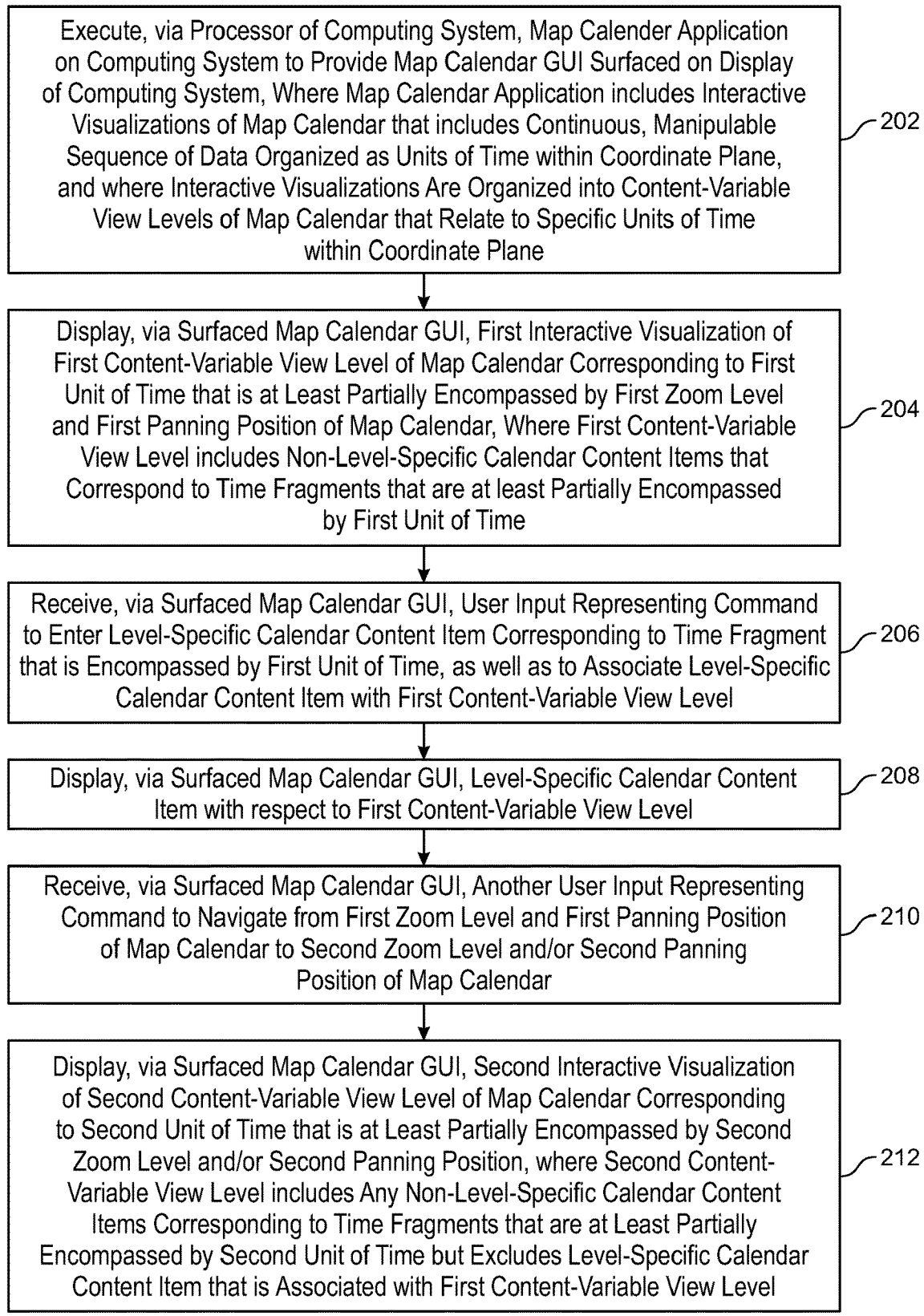
FIG. 2 is a process flow diagram of a method for implementing a map calendar GUI including content-variable view levels according to embodiments described herein.

Exemplary Methods for Implementing Map Calendar Application and Corresponding Map Calendar GUI Described Herein FIG. 2 is a process flow diagram of a method 200 for implementing a map calendar GUI including content-variable view levels according to embodiments described herein. According to embodiments described herein, the method 200 is executed via a computing system including a processor and a display operatively coupled to each other, such as, for example, the computing system described with respect to FIG. 3.

The method 200 begins at block 202, at which a map calendar application is executed on the computing system to provide the map calendar GUI surfaced on the display. The map calendar GUI includes interactive visualizations of a map calendar that includes a continuous, manipulable sequence of data organized as units of time within a coordinate plane. In addition, the interactive visualizations are organized into content-variable view levels of the map calendar that relate to specific units of time within the coordinate plane.

At block 204, a first interactive visualization of a first content-variable view level of the map calendar is displayed via the surfaced map calendar GUI. The first content-variable view level corresponds to a first unit of time that is at least partially encompassed by a first zoom level and a first panning position of the map calendar. Moreover, the first content-variable view level includes non-level-specific calendar content items that correspond to time fragments that are at least partially encompassed by the first unit of time.

At block 206, a user input is received via the surfaced map calendar GUI. The user input represents a command to add a level-specific calendar content item corresponding to a time fragment that is encompassed by the first unit of time to the map calendar such that the level-specific calendar content item is associated with the first content-variable view level and displayed within the first interactive visualization. In some embodiments, receiving the user input includes detecting a user-initiated insertion (e.g., via a drag-and-drop operation or a copy-and-paste operation) of the level-specific calendar content item into a general region of the first interactive visualization such that the time fragment for the level-specific calendar content item includes a generalized time fragment rather than a well-defined time fragment. In such embodiments, the level-specific calendar content item may be referred to as a floating, level-specific calendar content item. Moreover, those skilled in the art will appreciate that, while a single level-specific calendar content item is described with respect to block 206, this is for ease of discussion only. In practice, multiple user inputs may be used to add any number of level-specific calendar content items to the map calendar such that the level-specific calendar content items are associated with the first content-variable view level and displayed within the first interactive visualization.

At block 208, another user input is received via the surfaced map calendar GUI. The user input represents a command to navigate from the first zoom level and the first panning position of the map calendar to a second zoom level and/or a second panning position of the map calendar. For example, in some embodiments, the user input represents a command to navigate from the first zoom level and the first panning position to the second zoom level and the second panning position. In other embodiments, the user input represents a command to navigate from the first zoom level to the second zoom level, while remaining at the first panning position. In other embodiments, the user input represents a command to navigate from the first panning position to the second panning position, while remaining at the first zoom level.

At block 210, a second interactive visualization of a second content-variable view level of the map calendar is displayed via the surfaced map calendar GUI. The second content-variable view level corresponds to a second unit of time that is at least partially encompassed by the second zoom level and/or the second panning position of the map calendar. Moreover, the second interactive visualization includes any non-level-specific calendar content items corresponding to time fragments that are at least partially encompassed by the second unit of time but excludes the level-specific calendar content item that is associated with the first content-variable view level. Furthermore, in some embodiments, the method also includes receiving, via the surfaced map calendar GUI, another user input representing a command to add another level-specific calendar content item corresponding to a time fragment that is encompassed by the second unit of time to the map calendar such that the level-specific calendar content item is associated with the second content-variable view level and displayed within the second interactive visualization. Those skilled in the art will appreciate that this may optionally include adding any number of level-specific calendar content items to the map calendar such that the level-specific calendar content items are associated with the second content-variable view level and displayed within the second interactive visualization.

In various embodiments, the method 200 also includes storing, via the map calendar application, non-level-specific calendar content data corresponding to each non-level-specific calendar content item such that the non-level-specific calendar content data are associated with each content-variable view level that corresponds to a unit of time that at least partially encompasses the time fragment corresponding to the non-level-specific calendar content data. In such embodiments, the method 200 also includes storing, via the map calendar application, level-specific calendar content data corresponding to the level-specific calendar content item such that the level-specific calendar content data are associated with at least one user-designated content-variable view level (where the at least one user-designated content variable view level includes, but is not limited to, the first content-variable view level), while being inaccessible to all other content-variable view levels. In various embodiments, such calendar content data are stored within a memory and/or a disk storage corresponding to the computing system, as described further with respect to FIG. 3.

The block diagram of FIG. 2 is not intended to indicate that the blocks 202-210 of the method 200 are to be executed in any particular order, or that all of the blocks 202-210 of the method 200 are to be included in every case. Moreover, any number of additional blocks may be included within the method 200, depending on the details of the specific implementation. For example, in some embodiments, the method 200 also includes receiving, via the surfaced map calendar GUI, another user input representing a command to deactivate the content-variable view level functionality of the map calendar GUI. In such embodiments, the method 200 further includes automatically adapting, via the surfaced map calendar GUI, the first interactive visualization of the first content-variable view level of the map calendar such that the level-specific calendar content item (and any other level-specific calendar content items) are hidden from the first interactive visualization.

In some embodiments, the second unit of time corresponding to the second content-variable view level includes the first panning position and the second zoom level. As an example, this may correspond to an embodiment in which the first content-variable view level and the first unit of time include a day view level and at least a portion of a corresponding day, respectively, and the second content-variable view level and the second unit of time include a week view level and at least a portion of a corresponding week, respectively. In such embodiments, the method 200 may include receiving, via the surfaced map calendar GUI, another user input representing a command to add another level-specific calendar content item corresponding to a time fragment that is encompassed by the first unit of time and the second unit of time to the map calendar such that the level-specific calendar content item is associated with both the first content-variable view level and the second content-variable view level and displayed within both the first interactive visualization and the second interactive visualization. In this manner, one or more calendar content items may be associated with two or more corresponding content-variable view levels (e.g., a day view level and corresponding week view level) without being associated with any other corresponding content-variable view levels (e.g., a corresponding year view level and multi-year view level).

Furthermore, in some embodiments, the method 200 includes linking a level-specific calendar content item (such as the level-specific calendar content item described with respect to block 206) to a non-level-specific calendar content item that is shared among multiple users. For example, in such embodiments, the level-specific calendar content item may include a document, image, or the like that is saved within the information section for a shared meeting event. In such embodiments, receiving the user input at block 206 may further include receiving an additional command to enable a sync-and-merge functionality to maintain a privacy of the level-specific calendar content item as any updates are made to the non-level-specific calendar content item that is shared among the multiple users. In this manner, the user may save private documents, images, or the like within a shared meeting event without such information being shared with other users or being overwritten when another user updates the shared event information.

Exemplary Computing System for Implementing Techniques Described Herein

Figure 3:
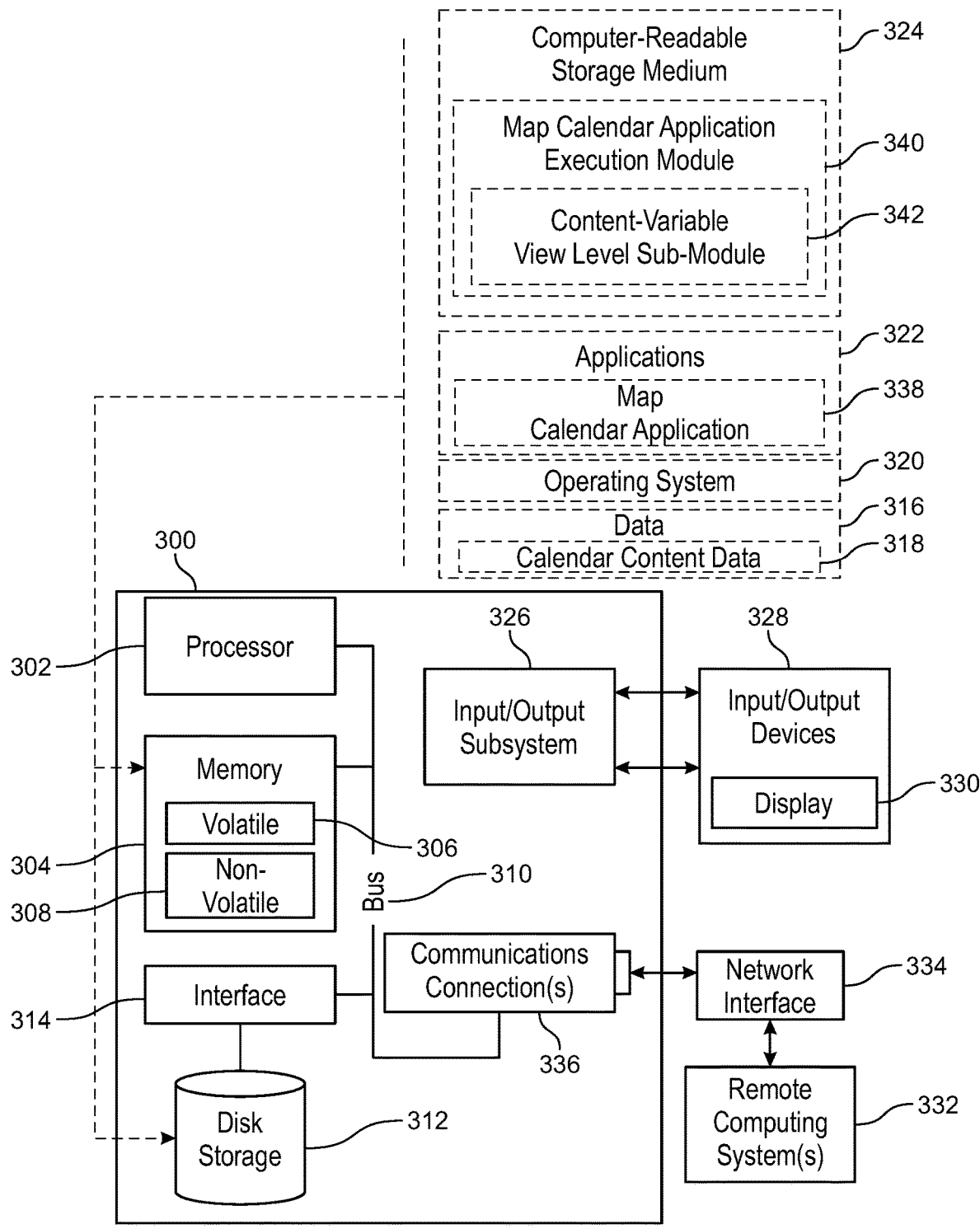
FIG. 3 is a block diagram of an exemplary computing system that can be used to implement the techniques described herein.

FIG. 3 is a block diagram of an exemplary computing system 300 that can be used to implement the techniques described herein. The exemplary computing system 300 includes a processor 302 and a memory 304. The processor 302 may include any suitable type of processing unit or device, such as, for example, a single-core processor, a multi-core processor, a computing cluster, or any number of other configurations. Moreover, the processor 302 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 304 typically (but not always) includes both volatile memory 306 and non-volatile memory 308. The volatile memory 306 retains or stores information so long as the memory is supplied with power. By contrast, the non-volatile memory 308 is capable of storing (or persisting) information even when a power supply is not available. The volatile memory 306 may include, for example, RAM (e.g., synchronous RAM (SRAM), dynamic RAM (DRAM), synchronous dynamic RAM (SDRAM), and the like) and CPU cache memory. The nonvolatile memory 308 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 302 and the memory 304, as well as other components of the computing system 300, are interconnected by way of a system bus 310. The system bus 310 can be implemented using any suitable bus architecture known to those skilled in the art.

According to the embodiment shown in FIG. 3, the computing system 300 also includes a disk storage 312. The disk storage 312 may include any suitable removable/non-removable, volatile/non-volatile storage component or device. For example, the disk storage 312 may include, but is not limited to, a magnetic disk drive, floppy disk drive, tape drive, Jaz drive, Zip drive, LS-210 drive, flash memory card, memory stick, or the like. In addition, the disk storage 312 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 312 to the system bus 310, a removable or non-removable interface is typically used, such as interface 314 shown in FIG. 3.

In various embodiments, the disk storage 312 and/or the memory 304 are used to store data 316 relating to the techniques described herein. Such data may include, for example, calendar content data 318 relating to one or more map calendars.

Those skilled in the art will appreciate that FIG. 3 describes software that acts as an intermediary between a user of the computing system 300 and the basic computing resources described with respect to the operating environment of the computing system 300. Such software includes an operating system 320. The operating system 320, which may be stored on the disk storage 312, acts to control and allocate the computing resources of the computing system 300. Moreover, system applications 322 take advantage of the management of the computing resources by the operating system 320 through one or more program modules stored within a computer-readable storage medium (or media) 324, as described further herein.

The computing system 300 also includes an input/output (I/O) subsystem 326. The I/O subsystem 326 includes a set of hardware, software, and/or firmware components that enable or facilitate inter-communication between the user of the computing system 300 and the processor 302 of the computing system 300. During operation of the computing system 300, the I/O subsystem 326 enables the user to interact with the computing system 300 through various input/output (I/O) devices 328. Such I/O devices 328 may include any number of input devices or channels, such as, for example, one or more touchscreen/haptic input devices, one or more buttons, one or more pointing devices, one or more accessories, one or more audio input devices, and/or one or more video input devices, such as a camera. As an example, in some embodiments, such input devices or channels include one or more Natural User Interface (NUI) devices, where the term "Natural User Interface (NUI)" refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented-reality and virtual-reality systems, all of which provide a more natural interface. Furthermore, in some embodiments the one or more input devices or channels connect to the processor 302 through the system bus 310 via one or more interface ports (not shown) integrated within the I/O subsystem 326. Such interface ports may include, for example, a serial port, a parallel port, a game port, and/or a universal serial bus (USB).

In addition, such I/O devices 328 may include any number of output devices or channels, such as, for example, one or more audio output devices, one or more haptic feedback devices, and/or one or more display devices, such as display 330. Such output devices or channels may use some of the same types of ports the input devices or channels. Thus, for example, a USB port may be used to both provide input to the computing system 300 and to output information from the computing system 300 to a corresponding output device. Moreover, in some embodiments, the one or more output devices or channels are accessible via one or more adapters (not shown) integrated within the I/O subsystem 326.

In some embodiments, the display 330 is a built-in display screen of the computing system 300. In other embodiments, the display 330 is an external display screen. Moreover, in some embodiments, the display device is a touchscreen that serves as both an input and an output device.

In some embodiments, the computing system 300 may be a server hosting various software applications in a networked environment using logical connections to one or more remote computing systems 332. Such remote computing systems 332 may be, for example, client systems configured with web browsers, PC applications, mobile phone applications, and the like. In addition, the remote computing systems 332 may include, for example, one or more personal computers, one or more servers, one or more routers, one or more network PCs, one or more workstations, one or more microprocessor-based appliances, one or more mobile phones, and/or one or more peer devices or other common network nodes.

In various embodiments, the remote computing devices 332 are logically connected to the computing system 300 through a network interface 334 and then connected via a communication connection 336, which may be wireless. The network interface 334 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 336 includes the hardware/software employed to connect the network interface 334 to the bus 310. While communication connection 336 is shown for illustrative clarity as residing inside the computing system 300, it can also be external to the computing system 300. The hardware/software for connection to the network interface 334 may include, for example, internal and external technologies, such as mobile phone switches, modems including regular telephone grade modems, cable modems and DSL modems, ISDN adapters, and/or Ethernet cards.

As described above, system applications 322, such as the map calendar application 338 described herein, take advantage of the management of the computing resources by the operating system 320 through one or more program modules stored within the computer-readable storage medium (or media) 324. In some embodiments, the computer-readable storage medium 324 is integral to the computing system 300, in which case it may form part of the memory 304 and/or the disk storage 312. In other embodiments, the computer-readable storage medium 324 is an external device that is connected to the computing system 300 when in use.

In various embodiments, the one or more program modules stored within the computer-readable storage medium 324 include program instructions or code that may be executed by the processor 302 to perform various operations, including the techniques described herein. In various embodiments, such program modules include, but are not limited to, a map calendar application execution module 340 that causes the processor 302 to perform operations that result in the execution of the map calendar application 338 to implement a corresponding map calendar GUI including content-variable view levels, as described with respect to the method 200 of FIG. 2, for example. Moreover, in various embodiments, the map calendar application execution module 340 includes one or more sub-modules, where such sub-modules include, but are not limited to, a content-variable view level sub-module 342.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional applications, additional modules, additional memory devices, additional network interfaces, etc.). Furthermore, any of the functionalities of the one or more program modules/sub-modules may be partially, or entirely, implemented in hardware and/or in the processor 302. For example, the functionality may be implemented with an application specific integrated circuit, in logic implemented in the processor 302, or in any other device.

Figure 4:
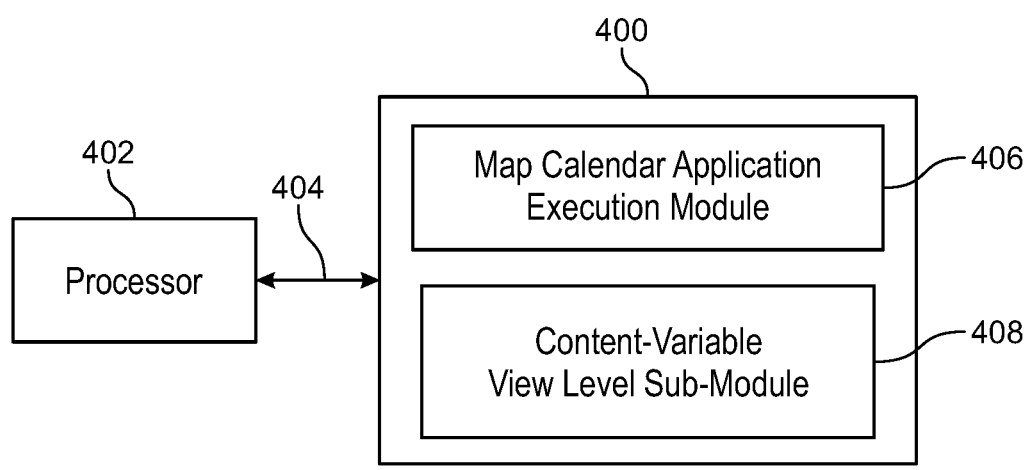
FIG. 4 is a block diagram of an exemplary computer-readable storage medium for implementing a map calendar GUI including content-variable view levels according to embodiments described herein.

FIG. 4 is a block diagram of an exemplary computer-readable storage medium 400 for implementing a map calendar GUI including content-variable view levels according to embodiments described herein. In various embodiments, the computer-readable storage medium 400 is accessed by a processor 402 over a computer interconnect 404. For example, the computer-readable storage medium 400 may be the same as, or similar to, the computer-readable storage medium 324 described with respect to the computing system 300 of FIG. 3 and, thus, the computer-readable storage medium 400 may be accessed by the processor 302 of the computing system 300 over the system bus 310.

In various embodiments, the computer-readable storage medium 400 includes code (i.e., computer-executable instructions) to direct the processor 402 to perform the operations of the present techniques. Such code may be stored within the computer-readable storage medium 400 in the form of program modules, where each module includes a set of computer-executable instructions that, when executed by the processor 402, cause the processor 402 to perform a corresponding set of operations. For example, a map calendar application module 406, which may include a content-variable view level sub-module 408 (as well as any number of other suitable sub-modules) may direct the processor 402 to perform the techniques described herein (or any suitable variation thereof). Such techniques include, but are not limited to, the method 200 of FIG. 2 for implementing the map calendar GUI including the content-variable view levels.

Moreover, it is to be understood that any suitable number of the software components shown in FIG. 4 may be included within the computer-readable storage medium 400. Furthermore, any number of additional software components not shown in FIG. 4 may be included within the computer-readable storage medium 400, depending on the details of the specific implementation.

Furthermore, it should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a method for implementing a map calendar graphical user interface (GUI) including content-variable view levels in a computing system including a processor and a display operatively coupled to each other is described. The method includes executing, via the processor, a map calendar application on the computing system to provide the map calendar GUI surfaced on the display, the map calendar GUI including interactive visualizations of a map calendar that includes a continuous, manipulable sequence of data organized as units of time within a coordinate plane, where the interactive visualizations are organized into content-variable view levels of the map calendar that relate to specific units of time within the coordinate plane. The method includes displaying, via the surfaced map calendar GUI, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The method includes receiving, via the surfaced map calendar GUI, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The method also includes receiving, via the surfaced map calendar GUI, a second user input representing a second command to navigate from the first zoom level and the first panning position of the map calendar to at least one of a second zoom level or a second panning position of the map calendar. The method further includes displaying, via the surfaced map calendar GUI, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

Example 2 includes the method of example 1, including or excluding optional features. In this example, the method includes storing, via the map calendar application, non-level-specific calendar content data corresponding to each non-level-specific calendar content item such that the non-level-specific calendar content data are associated with each content-variable view level that corresponds to a unit of time that at least partially encompasses the time fragment corresponding to the non-level-specific calendar content data. In this example, the method also includes storing, via the map calendar application, level-specific calendar content data corresponding to the level-specific calendar content item such that the level-specific calendar content data are associated with at least one user-designated content-variable view level, where the at least one user-designated content variable view level includes the first content-variable view level, while being inaccessible to all other content-variable view levels.

Example 3 includes the method of example 1 or 2, including or excluding optional features. In this example, the method includes receiving, via the surfaced map calendar GUI, a third user input representing a third command to deactivate a content-variable view level functionality of the map calendar GUI, as well as automatically adapting, via the surfaced map calendar GUI, the first interactive visualization of the first content-variable view level of the map calendar such that the level-specific calendar content item is hidden from the first interactive visualization.

Example 4 includes the method of any one of examples 1 to 3, including or excluding optional features. In this example, the method includes receiving, via the surfaced map calendar GUI, a fourth user input representing a fourth command to add a second level-specific calendar content item corresponding to a time fragment that is encompassed by the second unit of time to the map calendar such that the second level-specific calendar content item is associated with the second content-variable view level and displayed within the second interactive visualization.

Example 5 includes the method of any one of examples 1 to 4, including or excluding optional features. In this example, the second unit of time corresponding to the second content-variable view level includes the first panning position and the second zoom level, and where the method further includes receiving, via the surfaced map calendar GUI, a fifth user input representing a fifth command to add a third level-specific calendar content item corresponding to a time fragment that is encompassed by the first unit of time and the second unit of time to the map calendar such that the third level-specific calendar content item is associated with both the first content-variable view level and the second content-variable view level and displayed within both the first interactive visualization and the second interactive visualization.

Example 6 includes the method of example 5, including or excluding optional features. In this example, the first content-variable view level and the first unit of time include a day view level and at least a portion of a corresponding day, respectively; and the second content-variable view level and the second unit of time include a week view level and at least a portion of a corresponding week, respectively.

Example 7 includes the method of any one of examples 1 to 6, including or excluding optional features. In this example, receiving the first user input representing the first command to add the level-specific calendar content item to the map calendar includes detecting a user-initiated insertion of the level-specific calendar content item into a general region of the first interactive visualization such that the time fragment for the level-specific calendar content item includes a generalized time fragment rather than a well-defined time fragment.

Example 8 includes the method of any one of examples 1 to 7, including or excluding optional features. In this example, the level-specific calendar content item is linked to a non-level-specific calendar content item that is shared among multiple users, and receiving the first user input representing the first command to add the level-specific calendar content item to the map calendar includes receiving an additional command to enable a sync-and-merge functionality to maintain a privacy of the level-specific calendar content item as any updates are made to the non-level-specific calendar content item that is shared among the multiple users.

Example 9 is a computing system including a processor and a display operatively coupled to the processor. The computing system also includes a computer-readable storage medium operatively coupled to the processor, the computer-readable storage medium including computer-executable instructions that, when executed by the processor, cause the processor to execute a map calendar application on the computing system to provide a map calendar graphical user interface (GUI) surfaced on the display, the map calendar GUI including interactive visualizations of a map calendar that includes a continuous, manipulable sequence of data organized as units of time within a coordinate plane, wherein the interactive visualizations are organized into content-variable view levels of the map calendar that relate to specific units of time within the coordinate plane. The computer-executable instructions, when executed by the processor, also cause the processor to display, via the map calendar GUI surfaced on the display, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The computer-executable instructions, when executed by the processor, also cause the processor to receive, via the map calendar GUI surfaced on the display, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The computer-executable instructions, when executed by the processor, also cause the processor to receive, via the map calendar GUI surfaced on the display, a second user input representing a second command to navigate from the first zoom level and the first panning position of the map calendar to at least one of a second zoom level or a second panning position of the map calendar. The computer-executable instructions, when executed by the processor, further cause the processor to display, via the map calendar GUI surfaced on the display, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

Example 10 includes the computing system of example 9, including or excluding optional features. In this example, the computer-executable instructions, when executed by the processor, cause the processor to store, via the map calendar application, non-level-specific calendar content data corresponding to each non-level-specific calendar content item within at least one of a memory or a disk storage that is operatively coupled to the processor such that the non-level-specific calendar content data are associated with each content-variable view level that corresponds to a unit of time that at least partially encompasses the time fragment corresponding to the non-level-specific calendar content data. In this example, the computer-executable instructions, when executed by the processor, also cause the processor to store, via the map calendar application, level-specific calendar content data corresponding to the level-specific calendar content item within the at least one of the memory of the disk storage such that the level-specific calendar content data are associated with at least one user-designated content-variable view level, wherein the at least one user-designated content variable view level includes the first content-variable view level, while being inaccessible to all other content-variable view levels.

Example 11 includes the computing system of example 9 or 10, including or excluding optional features. In this example, the computer-executable instructions, when executed by the processor, cause the processor to receive, via the map calendar GUI surfaced on the display, a third user input representing a third command to deactivate a content-variable view level functionality of the map calendar GUI, as well as to automatically adapt, via the map calendar GUI surfaced on the display, the first interactive visualization of the first content-variable view level of the map calendar such that the level-specific calendar content item is hidden from the first interactive visualization.

Example 12 includes the computing system of any one of examples 9 to 11, including or excluding optional features. In this example, the computer-executable instructions, when executed by the processor, cause the processor to receive a fourth user input representing a fourth command to add a second level-specific calendar content item corresponding to a time fragment that is encompassed by the second unit of time to the map calendar such that the second level-specific calendar content item is associated with the second content-variable view level and displayed within the second interactive visualization.

Example 13 includes the computing system of any one of examples 9 to 12, including or excluding optional features. In this example, the second unit of time corresponding to the second content-variable view level includes the first panning position and the second zoom level, and the computer-executable instructions, when executed by the processor, cause the processor to receive, via the map calendar GUI surfaced on the display, a fifth user input representing a fifth command to add a third level-specific calendar content item corresponding to a time fragment that is encompassed by the first unit of time and the second unit of time to the map calendar such that the third level-specific calendar content item is associated with both the first content-variable view level and the second content-variable view level and displayed within both the first interactive visualization and the second interactive visualization.

Example 14 includes the computing system of example 13, including or excluding optional features. In this example, the first content-variable view level and the first unit of time include a day view level and at least a portion of a corresponding day, respectively; and the second content-variable view level and the second unit of time include a week view level and at least a portion of a corresponding week, respectively.

Example 15 includes the computing system of any one of examples 9 to 14, including or excluding optional features. In this example, the computer-executable instructions, when executed by the processor, cause the processor to receive the first user input representing the first command to add the level-specific calendar content item to the map calendar by detecting a user-initiated insertion of the level-specific calendar content item into a general region of the first interactive visualization such that the time fragment for the level-specific calendar content item comprises a generalized time fragment rather than a well-defined time fragment.

Example 16 includes the computing system of any one of examples 9 to 14, including or excluding optional features. In this example, the level-specific calendar content item is linked to a non-level-specific calendar content item that is shared among multiple users, and the computer-executable instructions, when executed by the processor, cause the processor to receive the first user input representing the first command to add the level-specific calendar content item along with an additional command to enable a sync-and-merge functionality to maintain a privacy of the level-specific calendar content item as any updates are made to the non-level-specific calendar content item that is shared among the multiple users.

Example 17 is a computer-readable storage medium including computer-executable instructions that, when executed by a processor of a computing system, cause the processor to execute a map calendar application to provide a map calendar graphical user interface (GUI) surfaced on a display that is operatively coupled to the processor, the map calendar GUI including interactive visualizations of a map calendar that includes a continuous, manipulable sequence of data organized as units of time within a coordinate plane, where the interactive visualizations are organized into content-variable view levels of the map calendar that relate to specific units of time within the coordinate plane. The computer-executable instructions, when executed by the processor, also cause the processor to display, via the surfaced map calendar GUI, a first interactive visualization of a first content-variable view level of the map calendar corresponding to a first unit of time that is at least partially encompassed by a first zoom level and a first panning position of the map calendar, where the first interactive visualization includes non-level-specific calendar content items that correspond to time fragments that are at least partially encompassed by the first unit of time. The computer-executable instructions, when executed by the processor, also cause the processor to receive, via the surfaced map calendar GUI, a first user input representing a first command to add a level-specific calendar content item corresponding to a time fragment that is encompassed by the first unit of time to the map calendar such that the level-specific calendar content item is associated with the first content-variable view level and displayed within the first interactive visualization. The computer-executable instructions, when executed by the processor, also cause the processor to receive, via the surfaced map calendar GUI, a second user input representing a second command to navigate from the first zoom level and the first panning position of the map calendar to at least one of a second zoom level or a second panning position of the map calendar. The computer-executable instructions, when executed by the processor, further cause the processor to display, via the surfaced map calendar GUI, a second interactive visualization of a second content-variable view level of the map calendar corresponding to a second unit of time that is at least partially encompassed by the at least one of the second zoom level or the second panning position of the map calendar, where the second interactive visualization includes any non-level-specific calendar content items corresponding to time fragments that are at least partially encompassed by the second unit of time but does not include the level-specific calendar content item that is associated with the first content-variable view level.

Example 18 includes the computing system of example 17, including or excluding optional features. In this example, the computer-executable instructions, when executed by the processor, cause the processor to store, via the map calendar application, non-level-specific calendar content data corresponding to each non-level-specific calendar content item such that the non-level-specific calendar content data are associated with each content-variable view level that corresponds to a unit of time that at least partially encompasses the time fragment corresponding to the non-level-specific calendar content data. In this example, the computer-executable instructions, when executed by the processor, also cause the processor store, via the map calendar application, level-specific calendar content data corresponding to the level-specific calendar content item such that the level-specific calendar content data are associated with at least one user-designated content-variable view level, where the at least one user-designated content variable view level includes the first content-variable view level, while being inaccessible to all other content-variable view levels.

Example 19 includes the computing system of example 18, including or excluding optional features. In this example, the computer-readable storage medium includes computer-executable instructions that, when executed by the processor, cause the processor to receive a fourth user input representing a fourth command to add a second level-specific calendar content item corresponding to a time fragment that is encompassed by the second unit of time to the map calendar such that the second level-specific calendar content item is associated with the second content-variable view level and displayed within the second interactive visualization.

Example 20 includes the computing system of example 19, including or excluding optional features. In this example, the computer-readable storage medium includes computer-executable instructions that, when executed by the processor, cause the processor to receive, via the surfaced map calendar GUI, a fifth user input representing a fifth command to add a third level-specific calendar content item corresponding to a time fragment that is encompassed by the first unit of time and the second unit of time to the map calendar such that the third level-specific calendar content item is associated with both the first content-variable view level and the second content-variable view level and displayed within both the first interactive visualization and the second interactive visualization.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for implementing a map calendar graphical user interface (GUI) comprising content-variable view levels in a computing system comprising a processor and a display operatively coupled to each other, the method comprising:

executing, via the processor, a map calendar application on the computing system to provide the map calendar GUI surfaced on the display, the map calendar GUI comprising interactive visualizations of a map calendar that comprises a continuous, manipulable sequence of data organized as units of time within a coordinate plane, wherein the interactive visualizations are organized into content-variable view levels of the map calendar, and wherein each content-variable view level comprises a specific grouping of units of time within the coordinate plane;

causing display, via the surfaced map calendar GUI, of a first interactive visualization of a first content-variable view level of the map calendar corresponding to a first unit of time that is at least partially encompassed by a first zoom level and a first panning position of the map calendar;

receiving, via the surfaced map calendar GUI, a first user input representing a first command to add a first level-specific calendar content item corresponding to a time fragment that is at least partially encompassed by the first unit of time to the map calendar such that the first level-specific calendar content item is stored with respect to the first content-variable view level and displayed within the first interactive visualization;

wherein the first interactive visualization comprises non-level-specific calendar content items that correspond to time fragments that are at least partially encompassed by the first unit of time and the first level-specific calendar content item assigned to the first content-variable view level, and wherein the first interactive visualization excludes a second level-specific calendar content item assigned to a second content-variable view level, even if the first content-variable view level at least partially encompasses a time fragment corresponding to the second level-specific calendar content item;

receiving, via the surfaced map calendar GUI, a second user input representing a second command to navigate from the first zoom level and the first panning position of the map calendar to at least one of a second zoom level or a second panning position of the map calendar; and causing display, via the surfaced map calendar GUI, of a second interactive visualization of the second content-variable view level of the map calendar corresponding to a second unit of time that is at least partially encompassed by the at least one of the second zoom level or the second panning position of the map calendar, wherein the second interactive visualization comprises any non-level-specific calendar content items corresponding to time fragments that are at least partially encompassed by the second unit of time and the second level-specific calendar content item assigned to the second content-variable view level but does not comprise the first level-specific calendar content item that is stored with respect to the first content-variable view level, even if the second content-variable view level at least partially encompasses a time fragment corresponding to the first level-specific calendar content item;

wherein the map calendar application is configured with multilevel data storage to provide the organization of the map calendar into the content-variable view levels by linking level-specific calendar content data corresponding to each level-specific calendar content item to at least one content-variable view level, while rendering the level-specific calendar content data inaccessible to all other content-variable view levels to which the level-specific calendar content item is not linked.

2. The method of claim 1, comprising organizing the map calendar into the content-variable view levels via the multilevel data storage of the map calendar application by:

storing, via the map calendar application, non-level-specific calendar content data corresponding to each non-level-specific calendar content item such that the non-level-specific calendar content data are associated with each content-variable view level that corresponds to a unit of time that at least partially encompasses the time fragment corresponding to the non-level-specific calendar content data; and storing, via the map calendar application, the level-specific calendar content data corresponding to each level-specific calendar content item such that the level-specific calendar content data are associated with at least one user-designated content-variable view level, while being inaccessible to all other content-variable view levels to which the level-specific calendar content item is not linked.

3. The method of claim 1, comprising:

receiving, via the surfaced map calendar GUI, a third user input representing a third command to deactivate a content-variable view level functionality of the map calendar GUI; and automatically adapting, via the surfaced map calendar GUI, the first interactive visualization of the first content-variable view level of the map calendar such that the first level-specific calendar content item is hidden from the first interactive visualization.

4. The method of claim 1, comprising receiving, via the surfaced map calendar GUI, a fourth user input representing a fourth command to add the second level-specific calendar content item corresponding to a time fragment that is at least partially encompassed by the second unit of time to the map calendar such that the second level-specific calendar content item is stored with respect to the second content-variable view level and displayed within the second interactive visualization.

5. The method of claim 1, wherein the second unit of time corresponding to the second content-variable view level comprises the first panning position and the second zoom level, and wherein the method comprises receiving, via the surfaced map calendar GUI, a fifth user input representing a fifth command to add a third level-specific calendar content item corresponding to a time fragment that is at least partially encompassed by the first unit of time and the second unit of time to the map calendar such that the third level-specific calendar content item is stored with respect to both the first content-variable view level and the second content-variable view level and displayed within both the first interactive visualization and the second interactive visualization.

6. The method of claim 5, wherein the first content-variable view level and the first unit of time comprise a day view level and at least a portion of a corresponding day, respectively; and wherein the second content-variable view level and the second unit of time comprise a week view level and at least a portion of a corresponding week, respectively.

7. The method of claim 1, wherein receiving the first user input representing the first command to add the first level-specific calendar content item to the map calendar comprises detecting a user-initiated insertion of the first level-specific calendar content item into a general region of the first interactive visualization such that the time fragment for the first level-specific calendar content item comprises a generalized time fragment rather than a well-defined time fragment.

8. The method of claim 1, wherein the first level-specific calendar content item is linked to a non-level-specific calendar content item that is shared among multiple users, and wherein receiving the first user input representing the first command to add the first level-specific calendar content item to the map calendar comprises receiving an additional command to enable a sync-and-merge functionality to maintain a privacy of the first level-specific calendar content item as any updates are made to the non-level-specific calendar content item that is shared among the multiple users.

9. A computing system, comprising:

a processor;

a display operatively coupled to the processor; and a computer-readable storage medium operatively coupled to the processor, the computer-readable storage medium comprising computer-executable instructions that, when executed by the processor, cause the processor to:

execute a map calendar application on the computing system to provide a map calendar graphical user interface (GUI) surfaced on the display, the map calendar GUI comprising interactive visualizations of a map calendar that comprises a continuous, manipulable sequence of data organized as units of time within a coordinate plane, wherein the interactive visualizations are organized into content-variable view levels of the map calendar, and wherein each content-variable view level comprises a specific grouping of units of time within the coordinate plane;

cause display, via the map calendar GUI surfaced on the display, of a first interactive visualization of a first content-variable view level of the map calendar corresponding to a first unit of time that is at least partially encompassed by a first zoom level and a first panning position of the map calendar;

receive, via the map calendar GUI surfaced on the display, a first user input representing a first command to add a first level-specific calendar content item corresponding to a time fragment that is at least partially encompassed by the first unit of time to the map calendar such that the first level-specific calendar content item is stored with respect to the first content-variable view level and displayed within the first interactive visualization;

wherein the first interactive visualization comprises non-level-specific calendar content items that correspond to time fragments that are at least partially encompassed by the first unit of time and the first level-specific calendar content item assigned to the first content-variable view level, and wherein the first interactive visualization excludes a second level-specific calendar content item assigned to a second content-variable view level, even if the first content-variable view level at least partially encompasses a time fragment corresponding to the second level-specific calendar content item;

receive, via the map calendar GUI surfaced on the display, a second user input representing a second command to navigate from the first zoom level and the first panning position of the map calendar to at least one of a second zoom level or a second panning position of the map calendar; and cause display, via the map calendar GUI surfaced on the display, of a second interactive visualization of the second content-variable view level of the map calendar corresponding to a second unit of time that is at least partially encompassed by the at least one of the second zoom level or the second panning position of the map calendar, wherein the second interactive visualization comprises any non-level-specific calendar content items corresponding to time fragments that are at least partially encompassed by the second unit of time and the second level-specific calendar content item assigned to the second content-variable view level but does not comprise the first level-specific calendar content item that is stored with respect to the first content-variable view level, even if the second content-variable view level at least partially encompasses a time fragment corresponding to the first level-specific calendar content item;

wherein the map calendar application is configured with multilevel data storage to provide the organization of the map calendar into the content-variable view levels by linking level-specific calendar content data corresponding to each level-specific calendar content item to at least one content-variable view level, while rendering the level-specific calendar content data inaccessible to all other content-variable view levels to which the level-specific calendar content item is not linked.

10. The computing system of claim 9, wherein the computer-executable instructions, when executed by the processor, cause the processor to organize the map calendar into the content-variable view levels via the multilevel data storage of the map calendar application by:

storing, via the map calendar application, non-level-specific calendar content data corresponding to each non-level-specific calendar content item within at least one of a memory or a disk storage that is operatively coupled to the processor such that the non-level-specific calendar content data are associated with each content-variable view level that corresponds to a unit of time that at least partially encompasses the time fragment corresponding to the non-level-specific calendar content data; and storing, via the map calendar application, the level-specific calendar content data corresponding to each level-specific calendar content item within the at least one of the memory of the disk storage such that the level-specific calendar content data are associated with at least one user-designated content-variable view level, while being inaccessible to all other content-variable view levels to which the level-specific calendar content item is not linked.

11. The computing system of claim 9, wherein the computer-executable instructions, when executed by the processor, cause the processor to:

receive, via the map calendar GUI surfaced on the display, a third user input representing a third command to deactivate a content-variable view level functionality of the map calendar GUI; and automatically adapt, via the map calendar GUI surfaced on the display, the first interactive visualization of the first content-variable view level of the map calendar such that the first level-specific calendar content item is hidden from the first interactive visualization.

12. The computing system of claim 9, wherein the computer-executable instructions, when executed by the processor, cause the processor to receive a fourth user input representing a fourth command to add the second level-specific calendar content item corresponding to a time fragment that is at least partially encompassed by the second unit of time to the map calendar such that the second level-specific calendar content item is stored with respect to the second content-variable view level and displayed within the second interactive visualization.

13. The computing system of claim 9, wherein the second unit of time corresponding to the second content-variable view level comprises the first panning position and the second zoom level, and wherein the computer-executable instructions, when executed by the processor, cause the processor to receive, via the map calendar GUI surfaced on the display, a fifth user input representing a fifth command to add a third level-specific calendar content item corresponding to a time fragment that is at least partially encompassed by the first unit of time and the second unit of time to the map calendar such that the third level-specific calendar content item is stored with respect to both the first content-variable view level and the second content-variable view level and displayed within both the first interactive visualization and the second interactive visualization.

14. The computing system of claim 13, wherein the first content-variable view level and the first unit of time comprise a day view level and at least a portion of a corresponding day, respectively; and wherein the second content-variable view level and the second unit of time comprise a week view level and at least a portion of a corresponding week, respectively.

15. The computing system of claim 9, wherein the computer-executable instructions, when executed by the processor, cause the processor to receive the first user input representing the first command to add the first level-specific calendar content item to the map calendar by detecting a user-initiated insertion of the first level-specific calendar content item into a general region of the first interactive visualization such that the time fragment for the first level-specific calendar content item comprises a generalized time fragment rather than a well-defined time fragment.

16. The computing system of claim 9, wherein the first level-specific calendar content item is linked to a non-level-specific calendar content item that is shared among multiple users, and wherein the computer-executable instructions, when executed by the processor, cause the processor to receive the first user input representing the first command to add the first level-specific calendar content item along with an additional command to enable a sync-and-merge functionality to maintain a privacy of the first level-specific calendar content item as any updates are made to the non-level-specific calendar content item that is shared among the multiple users.

17. A computer-readable storage medium comprising computer-executable instructions that, when executed by a processor, cause the processor to:

execute a map calendar application to provide a map calendar graphical user interface (GUI) surfaced on a display that is operatively coupled to the processor, the map calendar GUI comprising interactive visualizations of a map calendar that comprises a continuous, manipulable sequence of data organized as units of time within a coordinate plane, wherein the interactive visualizations are organized into content-variable view levels of the map calendar, and wherein each content-variable view level comprises a specific grouping of units of time within the coordinate plane;

cause display, via the surfaced map calendar GUI, of a first interactive visualization of a first content-variable view level of the map calendar corresponding to a first unit of time that is at least partially encompassed by a first zoom level and a first panning position of the map calendar;

receive, via the surfaced map calendar GUI, a first user input representing a first command to add a first level-specific calendar content item corresponding to a time fragment that is at least partially encompassed by the first unit of time to the map calendar such that the first level-specific calendar content item is stored with respect to the first content-variable view level and displayed within the first interactive visualization;

wherein the first interactive visualization comprises non-level-specific calendar content items that correspond to time fragments that are at least partially encompassed by the first unit of time and the first level-specific calendar content item assigned to the first content-variable view level, and wherein the first interactive visualization excludes a second level-specific calendar content item assigned to a second content-variable view level, even if the first content-variable view level at least partially encompasses a time fragment corresponding to the second level-specific calendar content item;

receive, via the surfaced map calendar GUI, a second user input representing a second command to navigate from the first zoom level and the first panning position of the map calendar to at least one of a second zoom level or a second panning position of the map calendar; and cause display, via the surfaced map calendar GUI, of a second interactive visualization of the second content-variable view level of the map calendar corresponding to a second unit of time that is at least partially encompassed by the at least one of the second zoom level or the second panning position of the map calendar, wherein the second interactive visualization comprises any non-level-specific calendar content items corresponding to time fragments that are at least partially encompassed by the second unit of time and the second level-specific calendar content item assigned to the second content-variable view level but does not comprise the first level-specific calendar content item that is stored with respect to the first content-variable view level, even if the second content-variable view level at least partially encompasses a time fragment corresponding to the first level-specific calendar content item;

wherein the map calendar application is configured with multilevel data storage to provide the organization of the map calendar into the content-variable view levels by linking level-specific calendar content data corresponding to each level-specific calendar content item to at least one content-variable view level, while rendering the level-specific calendar content data inaccessible to all other content-variable view levels to which the level-specific calendar content item is not linked.

18. The computer-readable storage medium of claim 17, wherein the computer-executable instructions, when executed by the processor, cause the processor to organize the map calendar into the content-variable view levels via the multilevel data storage of the map calendar application by:

storing, via the map calendar application, non-level-specific calendar content data corresponding to each non-level-specific calendar content item such that the non-level-specific calendar content data are associated with each content-variable view level that corresponds to a unit of time that at least partially encompasses the time fragment corresponding to the non-level-specific calendar content data; and storing, via the map calendar application, level-specific calendar content data corresponding to each level-specific calendar content item such that the level-specific calendar content data are associated with at least one user-designated content-variable view level, while being inaccessible to all other content-variable view levels to which the level-specific calendar content item is not linked.

19. The computer-readable storage medium of claim 17, wherein the computer-executable instructions, when executed by the processor, cause the processor to receive a fourth user input representing a fourth command to add the second level-specific calendar content item corresponding to a time fragment that is at least partially encompassed by the second unit of time to the map calendar such that the second level-specific calendar content item is stored with respect to the second content-variable view level and displayed within the second interactive visualization.

20. The computer-readable storage medium of claim 17, wherein the second unit of time corresponding to the second content-variable view level comprises the first panning position and the second zoom level, and wherein the computer-executable instructions, when executed by the processor, cause the processor to receive, via the surfaced map calendar GUI, a fifth user input representing a fifth command to add a third level-specific calendar content item corresponding to a time fragment that is at least partially encompassed by the first unit of time and the second unit of time to the map calendar such that the third level-specific calendar content item is stored with respect to both the first content-variable view level and the second content-variable view level and displayed within both the first interactive visualization and the second interactive visualization.

* * * * *